United States Patent [19]

Ohji et al.

[11] Patent Number: 5,126,906
[45] Date of Patent: Jun. 30, 1992

[54] ROTARY MAGNETIC HEAD DEVICE WITH ROTARY TRANSFORMER HAVING HIGH COUPLING COEFFICIENT

[75] Inventors: Toshio Ohji, Mito; Juichi Morikawa; Hideo Zama, both of Katsuta, all of Japan

[73] Assignee: Hitachi, Ltd., Tokyo, Japan

[21] Appl. No.: 508,705

[22] Filed: Apr. 13, 1990

[30] Foreign Application Priority Data

Apr. 17, 1989 [JP] Japan .................. 1-095153
Dec. 25, 1989 [JP] Japan .................. 1-332714

[51] Int. Cl.$^5$ .................. G11B 5/52; G11B 21/18
[52] U.S. Cl. .................. 360/108; 360/107
[58] Field of Search .......... 360/108, 107, 84, 123, 360/130.22, 130.24, 130.23, 64, 85, 95; 310/71, 184, 198, 254, 261, 179, 180, 182, 185, 210, 258, 264

[56] References Cited

U.S. PATENT DOCUMENTS 3,911,486 10/1975 Hibbard .................. 360/108
4,609,960 9/1986 Fujioka .................. 360/107

FOREIGN PATENT DOCUMENTS 54-110723 8/1979 Japan .
58-129620 9/1983 Japan .
59-78508  5/1984 Japan .
61-84006  4/1986 Japan .
61-201405 9/1986 Japan .
62-114868 5/1987 Japan .
62-179107 8/1987 Japan .
63-80510  4/1988 Japan .

OTHER PUBLICATIONS

National Technical Report vol. 18, No. 4, Aug. 1972 "Design of Rotary Transformer".

Primary Examiner—John H. Wolff
Assistant Examiner—Craig A. Renner
Attorney, Agent, or Firm—Antonelli, Terry, Stout & Kraus

[57] ABSTRACT

A rotary magnetic head device and a rotary transformer used therefor are disclosed. A pair of throughholes, through which the starting extremity and the ending extremity of each of a plurality of coil conductors disposed on the rotor core and the stator core constituting the rotary transformer are led to the respective rear surfaces, are linked by a linking slit. Alternatively one throughhole, through which both the starting extremity and the ending extremity of each of the coil conductors are led, is divided into two throughholes by disposing therein a non-magnetic partitioning member having a thermal expansion coefficient close to that of the magnetic body within a region of 15%. In this way, the two throughholes behave magnetically as if the starting extremity and the ending extremity of each of coil conductors passed through one throughhole, so that magnetic field components produced at the starting portion and the ending portion cancel each other and that the coupling coefficient between the rotor core and the stator core is increased.

11 Claims, 31 Drawing Sheets

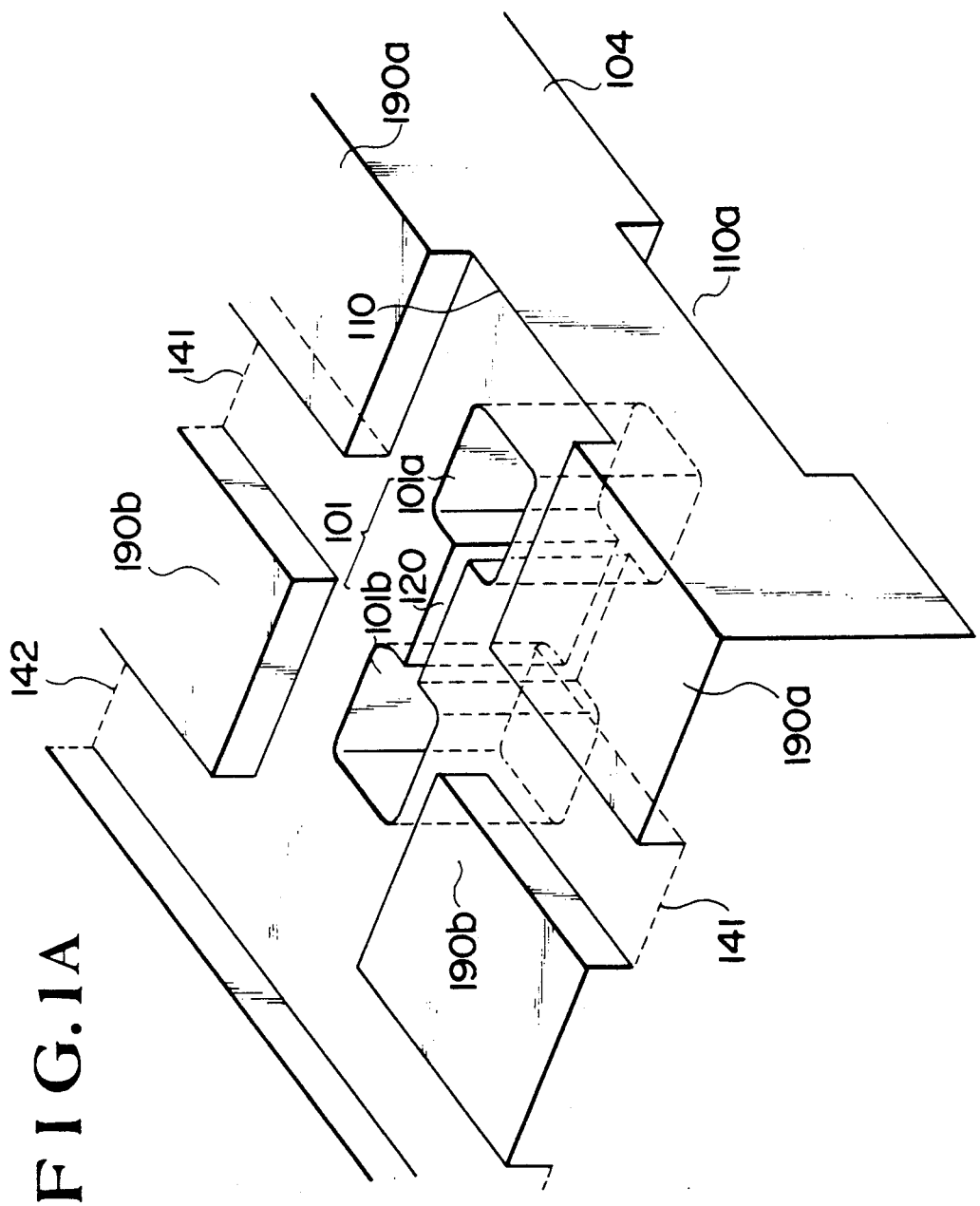

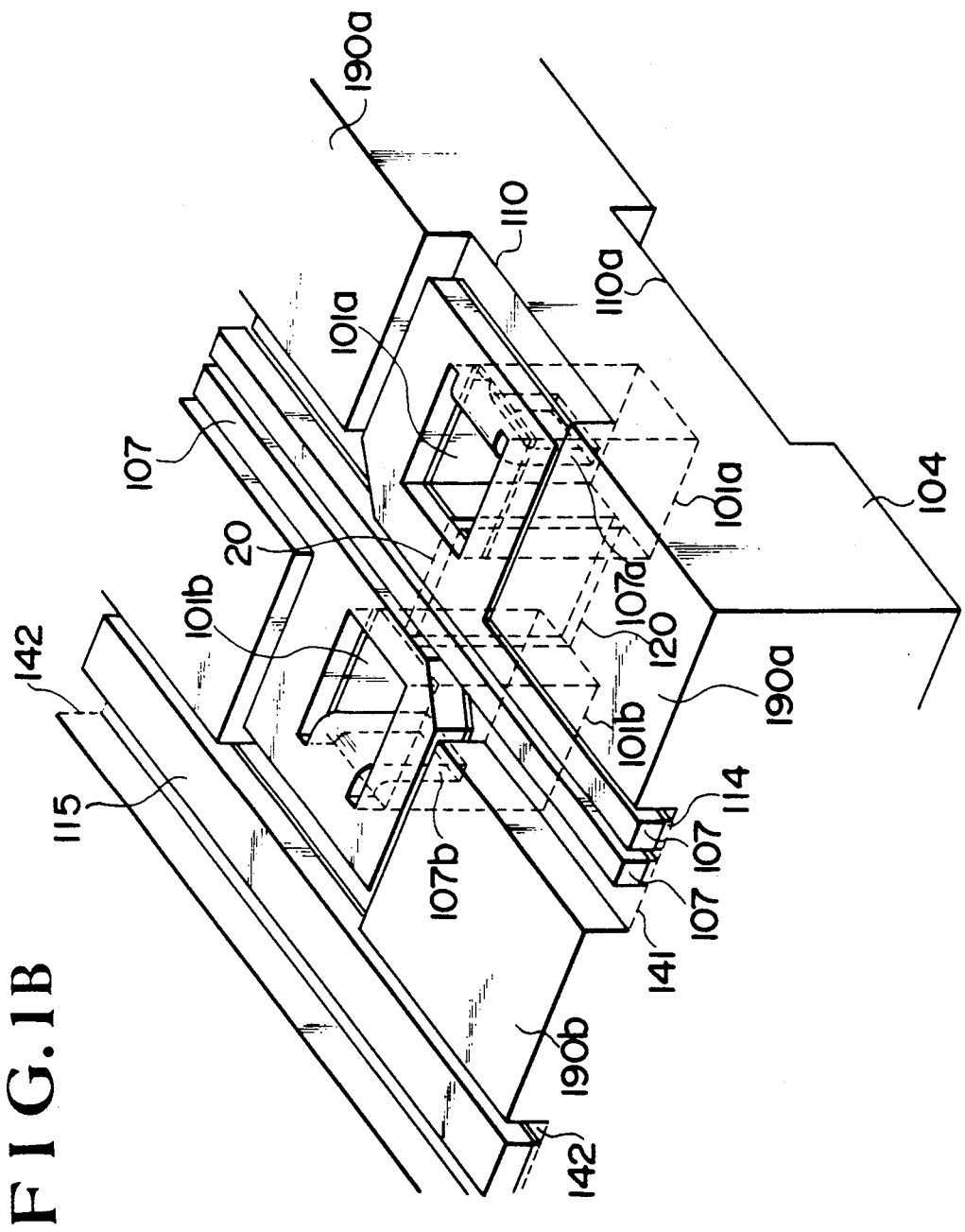

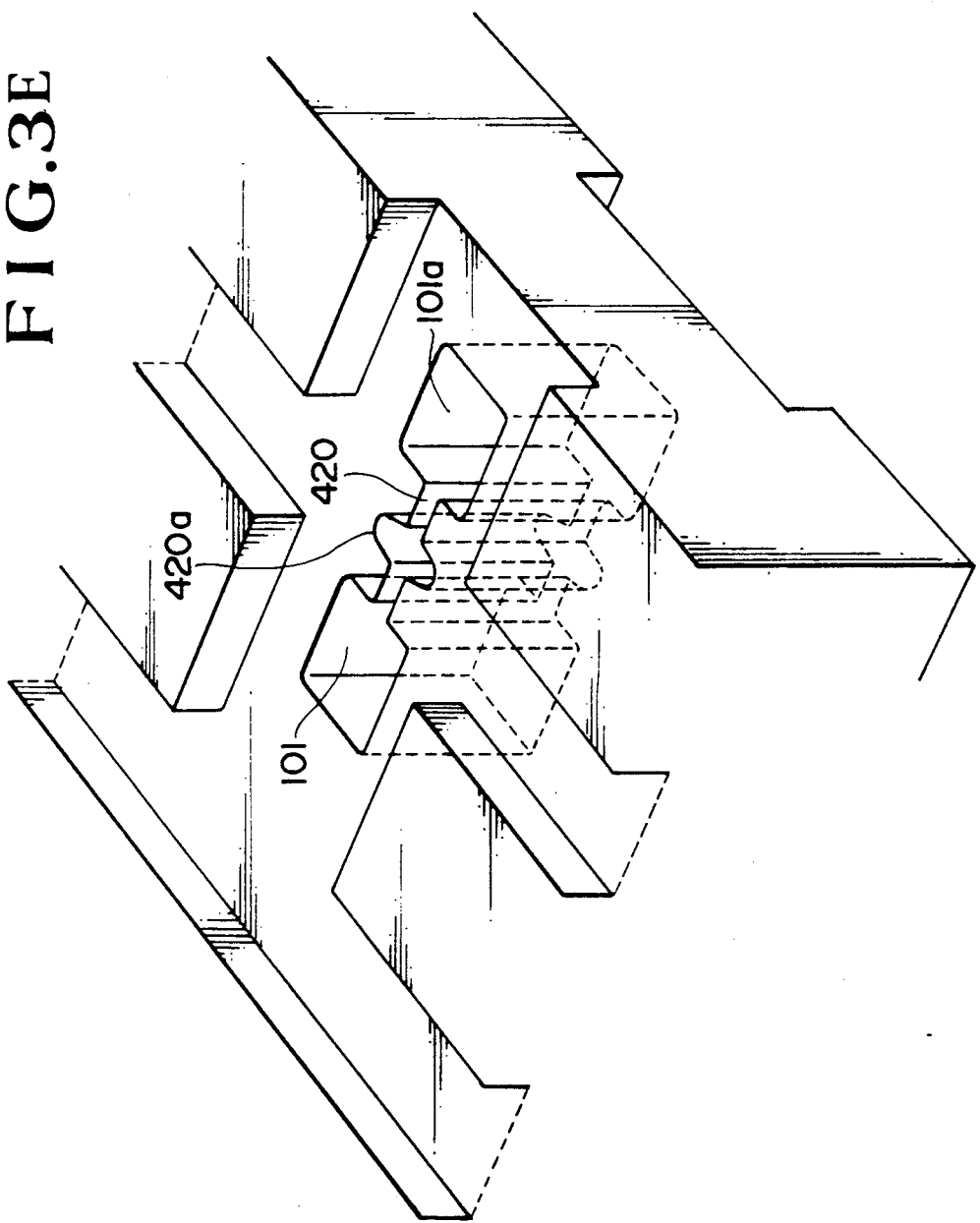

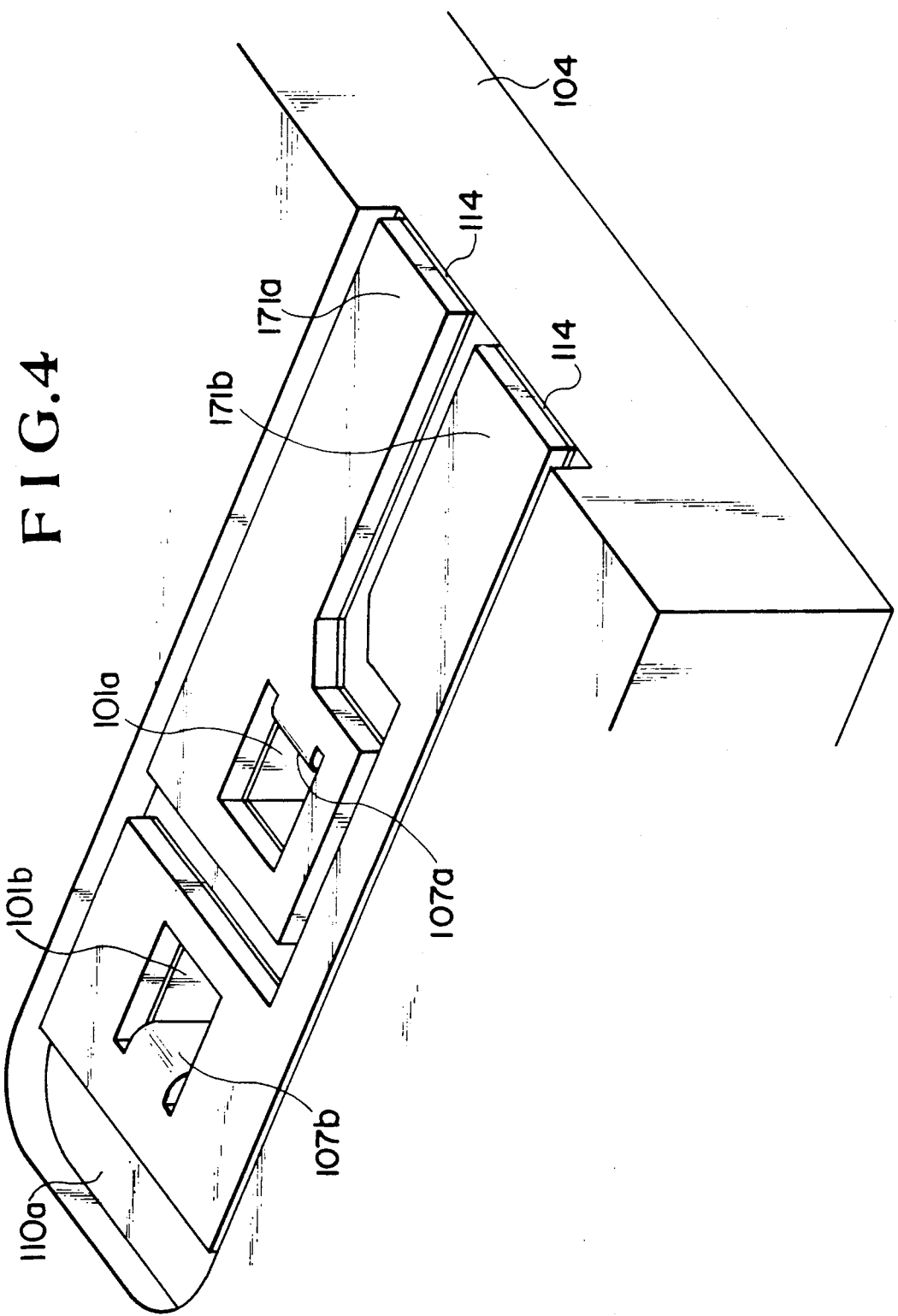

(X-O-Y CROSS SECTION)

(X-O-Y CROSS SECTION)

(X-O-Y CROSS SECTION)

(X-O-Y CROSS SECTION)

(X-O-Y CROSS SECTION)

ROTARY MAGNETIC HEAD DEVICE WITH ROTARY TRANSFORMER HAVING HIGH COUPLING COEFFICIENT

BACKGROUND OF THE INVENTION

The present invention relates to a rotary magnetic head device and a rotary transformer used therefor, and more in detail to a rotary magnetic head device and a rotary transformer used therefor utilized in a VTR (video tape recorder), a DAT (digital audio tape recorder), etc.

FIG. 15 is a cross sectional view indicating the principal part of a rotary cylinder in a rotary magnetic head device used heretofore, in which reference numeral 1 is a magnetic head; 1a is a head base; 2 is a rotary drum; 2a is a fixed drum; 3 is a relay plate (rotor side); 4 is a rotor core (hereinbelow called sometimes simply rotor); 5 is a rotating shaft; 6 is a relay plate (stator side); 7 is a coil (rotor side); 8 is a stator core (hereinbelow called sometimes simply stator); 9 is a coil (stator side); 12 is a ball bearing; and 13 is a disc. Here the rotor core 4 and the stator core 8 constitute a rotary transformer.

As it can be seen from the figure, the rotating shaft 5 is supported rotatably by the fixed drum 2a. The disc 13 is secured to the upper portion of the rotating shaft 5 by inserting the latter in the former. The rotary drum 2, to which the magnetic head 1 is secured, is fixed to the disc 13 and the rotor core 4 as an element constituting the rotary transformer is fixed to the lower portion of the disc 13 by adhesion, coaxially with respect to the rotating shaft 5.

On the other hand, the stator core 8 as the other constituent element of the rotary transformer is fixed to the fixed drum 2a by adhesion, etc., coaxially with respect to the rotating shaft 5.

A driving motor is mounted on the lower portion of the rotating shaft 5 (lower portion of the fixed drum 2a) so as to obtain a driving force (rotating force), although it is not indicated in the figure. The electrical connection between the magnetic head 1 mounted on the rotary drum 2 and the rotor 4 constituting the rotary transformer is effected by the contact between a male relay 31 and a female relay 32.

The rotary transformer composed of the rotor 4 and the stator 8 transmits signals between coils by the fact that a number of coils, which is in general equal to the number of magnetic heads 1, are disposed in grooves formed in the surface portions of the magnetic cores constituting the rotor and the stator, which grooves formed in the magnetic core serving as the rotor 4 and the magnetic core serving as the stator 8, respectively, are disposed coaxially so as to be opposite to each other. The interval between the rotor (magnetic core) 4 and the stator (magnetic core) 8, which are opposite to each other, is about 10 to 60 μm.

FIGS. 16A, 16B, 16C and 16D are cross-sectional views of the principal part of the rotary transformer in a state where the rotor core 4 and the stator core 8 constituting it are opposite to each other. FIGS. 16A and 16B show examples, in which approximately cylindrical conductors, on the outer periphery of which insulating films are disposed, such as polyurethane copper wire, are secured in grooves 41 and 81 by using an adhesive 14 in the form of coils 7 and 9, respectively. On the other hand, FIGS. 16C and 16D show examples, in which spiral coils 7 and 9 are formed simultaneously directly on core surfaces in a plurality of grooves by sputtering, evaporation, and metallizing, etching, etc., using the photolithographic technique. FIGS. 16B and 16C show examples of coils 7 having a single turn.

In order to connect the beginning portion and the ending portion of the coils 7 and 9 with the relays described above, etc., it is necessary to draw out the lead portions of coil end portions on the surfaces, which are opposite to the opposite surfaces of the magnetic cores 4 and 8, in some form. FIGS. 17A, 17B, 17C, 17D and 17E are perspective views showing prior art forms of such a lead portion.

FIG. 17A is a perspective view showing an example, in which the starting lead portion 7a and the ending lead portion 7b of the coil 7 are drawn out on the surface on the opposite side, utilizing a throughhole 401 disposed in the groove 41 formed in the magnetic core 4 for a plurality of turns of the coil 7 indicated in FIG. 16A. It will be recognized that both the starting lead portion 7a and the ending lead portion 7b are inserted in the same hole 401.

FIG. 17B relates to the coil 7 having a single turn indicated in FIG. 16B and represents an example, in which throughholes 401a and 401b are formed independently at end portions of the groove 41 and the starting lead portion 7a of the coil 7 is inserted in the throughhole 401a, while the ending lead portion 7b is inserted in the throughhole 401b.

FIG. 17C shows an example, in which two throughholes 401a and 401b are formed in the groove 41 for the coil 7 having a single turn and the starting lead portion 7a and the ending lead portion 7b are so arranged that they are inserted in the throughholes 401a and 401b, respectively.

FIG. 17D shows an example, in which, for a coil having a plurality of turns indicated in FIG. 16A, no throughholes are formed to be utilized, but a groove 410 for drawing out a lead is formed in the coil groove 41 on the magnetic core 4, the starting lead portion 7a and the ending lead portion 7b being drawn out by means thereof.

FIG. 17E shows an example, in which the spiral coil 7 formed simultaneously in a plurality of grooves by metallizing, etching, etc. using sputtering, evaporation and the photolithographic technique is arranged so that it is drawn out through two throughholes 401a and 401b formed in the neighborhood of the groove 41, the starting lead portion 7a and the ending lead portion 7b being drawn out separately through the throughholes 401a and 401b, respectively, and the lead portions are formed at the same time as the formation of the coil 7.

FIGS. 18A, 18B and 18C are schemes representing a related art example of the rotor core of the rotary transformer having the coil arrangement indicated in FIG. 17A, FIG. 18A being a plan view; FIG. 18B being a cross sectional view; FIG. 18C being a back view thereof. In these figure, reference numeral 4 is the core; 40 is a positioning groove; 42 is a groove for a short ring; 41, 43, 44 and 45 are coil grooves; and 401 and 403 to 405 are throughholes. All the throughholes 401 to 405 pass through from one side of the core 4 to the other and it is a matter of course that the starting and the ending lead portions disposed in the coil grooves 41, 43, 44 and 45 are led to the other side of the core 4 through the throughholes stated above to effect required electric connections.

FIGS. 18D, 18E and 18F are schemes representing a related art example of the stator core of the rotary transformer corresponding to the rotor core shown in FIGS. 18A to 18C, FIG. 18D being a plan view; FIG. 18E being a cross sectional view; FIG. 18F being a back view. In these figures, reference numeral 8 is a core; 80 is the positioning groove; 82 is the groove for a short ring: 81, 83, 84 and 85 are the coil grooves; and 801 and 803 to 805 are the throughholes. The stator core is almost identical to the rotor core in its construction and action.

FIGS. 19A, 19B and 19C are schemes representing another related art example of the rotor core having the coil arrangement indicated in FIG. 17B, FIG. 19A being a plan view; FIG. 19B being a cross sectional view; FIG. 19C being a back view. Here an example is shown, in which two sets of throughholes 401a and 403a to 405a, and 401b and 403b to 405b, are disposed as indicated by suffixes a and b and the starting lead portions and the ending lead portions are led to the other side of the core through separate holes to effect required electric connections.

FIGS. 19D, 19E and 19F are schemes representing another related art example of the stator core corresponding to the rotor core shown in FIGS. 19A to 19C, FIG. 19D being a plan view; FIG. 19E being a cross sectional view; FIG. 19F being a back view. There are disposed two sets of throughholes 801a and 803a to 805a, and 801b and 803b to 805b, which are indicated by suffixes a and b.

FIGS. 20A, 20B and 20C are schemes representing another related art example of the rotor core having a coil arrangement approximately identical to that indicated in FIG. 17E, FIG. 20A being a plan view; FIG. 20B being a cross sectional view; FIG. 20C being a back view. Here an example is shown, in which two sets of throughholes 401a and 403a to 405a and 401b and 403b to 405b, are disposed as indicated by suffixes a and b and the starting lead portions and the ending lead portions are led to the other side of the core 4.

FIGS. 20D, 20E and 20F are schemes representing another related art example of the stator core corresponding to the rotor core shown in FIG. 20A to 20C FIG. 20D being a plan view; FIG. 20E being a cross sectional view; FIG. 20F being a back view. Two sets of throughholes 801a and 803a to 805a, and 801b and 803b to 805b, are disposed, which are indicated by suffixes a and b.

FIGS. 21A, 21B and 21C are schemes representing still another example of the rotor core, in which the coil is arranged as indicated in FIG. 17D, FIG. 21A being a plan view; FIG. 21B being a cross sectional view; FIG. 21C being a back view; in which reference numerals 41 and 43 to 45 and 410 and 430 to 450 indicate coil grooves.

FIGS. 21D, 21E and 21F are schemes representing another related art example of the stator core corresponding to the rotor core shown in FIGS. 21A to 21C, FIG. 21D being a plan view; FIG. 21E being a cross sectional view; FIG. 21F being a back view; in which reference numerals 81 and 83 to 830 to 850 indicate coil grooves.

FIGS. 22A, 22B and 22C are schemes representing still another example of the rotor core, FIG. 22A being a plan view; FIG. 22B being a cross sectional view; FIG. 22C being a back view; in which 401a, and 403a, 403b to 405a, 405b are small holes, which are formed by dividing one throughhole having a diameter of about 1 mm into two holes with a partitioning member 10 made of non-magnetic resin, etc., in order to draw out an uninsulated coil through the same throughhole.

FIGS. 22D, 22E and 22F are schemes representing an example of the stator core corresponding to the rotor core shown in FIGS. 22A to 22C, FIG. 22D being a plan view; FIG. 22E being a cross sectional view; FIG. 22F being a back view; in which 801a, 801b and 803a, and 803b to 805a, 805b are small holes, which are formed by dividing one throughhole into two holes with a partitioning member 10 made of non-magnetic resin, etc.

In the above related art rotary magnetic head devices and rotary transformers used therefor have been described. As literature describing such related art techniques, JP-A-59-78508, JP-A-61-201405, JP-A-62-179107, JP-U-A-62-114868, JP-U-A-54-110723, JP-U-A-58-129620, JP-A-63-80510, etc., can be cited.

In the related art techniques described above, if a lead, whose outer periphery is coated with an insulating film, such as a polyurethane copper wire, explained referring to e.g. FIGS. 16A and 16B, is used as the coil for the rotary transformer, it is possible to draw out the starting extremity and the ending extremity of the lead through the same throughhole 401, as indicated in FIG. 17A. Since the direction of the current flowing through the starting extremity and that flowing through the ending extremity are opposite to each other, the magnetic field components produced around the two leads are canceled by each other so that the sum of them is close to zero and therefore they have no undesirable influence on the coupling coefficient between the coil on the rotor core and the coil on the stator core, determining characteristics of the rotary transformer.

However, in order to fabricate the coil with this insulated coated lead, a number of fabrication steps are necessary. In particular, recently, in a rotary transformer, on which a number of magnetic heads are mounted, in order to meet requirements of high performance in a VTR, etc., there are disposed the same number of coils (tracks) on the rotary core side and on the stator core as that of the magnetic heads and since the number of coils (tracks) disposed in the rotary transformer is increased, a great number of steps are required. For this reason, it is desired to form spiral coils 7 and 9 simultaneously in a plurality of grooves on the cores by sputtering, evaporation, metallization, and etching, etc., using the photolithographic technique, as indicated in FIGS. 16C and 16D.

However, in this case, in order to prevent a short-circuit between the starting extremity and the ending extremity of the uninsulated lead thus formed, it is necessary to dispose a throughhole 401a for the starting lead and a throughhole 401b for the ending lead separately in the coil as indicated in FIG. 17E to draw out the starting and the ending extremity, respectively. In this case, another problem is produced. That is, as described previously, in the case where the starting and the ending extremity of the lead are drawn out through the same throughhole, since the direction of the current flowing through the starting lead and that flowing through the ending lead are opposite to each other, the magnetic field components generated around the two leads cancel each other. On the contrary, in the case where they are drawn out through separate throughholes, the magnetic field components don't cancel each other and therefore they have an undesirable influence as a leakage inductance. For this reason, the coupling coefficient between the coil on the rotor core and the coil on the stator core is worsened and the signal transmission efficiency between the two coils is lowered. In particular, in the rotary transformer in the rotary magnetic head device, on which a number of magnetic heads are mounted, the same number of coils (tracks) as the number of the magnetic heads is disposed so that the interval between two adjacent coils is decreased and the width of the coils (tracks) is also reduced. For this reason, worsening a in the coupling coefficient is significant.

As a related technique for preventing this worsening of the coupling coefficient, that disclosed e.g. in JP-A-63-8050 can be cited. According to this technique, in order to draw out both the starting lead and the ending lead formed by the photolithographic technique through the same throughhole, an insulator is disposed between different coil conductors, which are connected with separate members serving as lead conductors, and these lead conductors are located in the throughhole. By this method, steps of applying the insulator and connecting the coil with the lead conductors were necessary and it was required to connect electrically the lead conductors further with other members at the position, where the lead conductors emerge from the throughhole.

As another related technique, a method is known, by which a hole is divided into two small holes by using a non-magnetic substance and the starting lead and the ending lead are drawn out through the respective throughholes. However, by this rotary transformer, although the worsening of the coupling coefficient is lessened, since the non-magnetic substance disposed in the hole for dividing it has been heretofore a material made of resin having a significant difference in a thermal expansion coefficient from the magnetic substance constituting the cores, when they are heated for sintering, etc. at the fabrication of the coils, it gives rise to stress, which remains in the interior thereof, which gives rise to a problem that cracks are produced in the cores.

Further, in the case where a hole is divided into two small holes, through which the starting lead and the ending lead are drawn out respectively, when the lead itself is formed by sputtering, evaporation, metallizing, etc., the lead is formed on the surface of the material made of resin serving as the non-magnetic substance. Therefore there has been problem that the device was lacking in the reliability from the point of view of thermal influences, resistance against chemical reagents, etc.

SUMMARY OF THE INVENTION

In order to overcome the problems described above of the prior art techniques, the object of the present invention is to provide a rotary magnetic head device constructed by using a rotary transformer, for which it is possible to decrease the number of fabrication steps in forming throughholes disposed in the cores constituting the rotary transformer without worsening the coupling coefficient between the coil on the rotary core and the coil on the stator core and in which no cracks due to thermal stress are produced in the core constituting the rotary transformer and thus a high reliability can be obtained also from the point of view of thermal influences, resistance against chemical reagents, etc., and such a rotary transformer itself.

In order to achieve the above object, a first rotary magnetic head device and a rotary transformer used therefor according to the present invention, in which between a rotor core and a stator core constituting the rotary transformer, the rotor core is mounted on a rotary drum and the stator core is mounted on a fixed drum and they are so disposed that signals to be recorded are supplied to magnetic heads on the rotary drum side from the fixed drum side through the rotary transformer described above and that signals reproduced from the magnetic heads stated above are transmitted to the fixed drum side through the rotary transformer described above, is characterized in that in either one or both of the rotor core and the stator core stated above constituting the rotary transformer a pair of throughholes are disposed in the thickness direction of a soft ferrite body therein, which is a magnetic body constituting the cores, a linking slit linking the pair of throughholes so that they behave magnetically as if they were a single throughhole, the width of a linking slit linking the pair of throughholes described above being smaller than the diameter of the throughholes described above, and that the starting and the ending extremity of a conductor acting as a coil formed on the surface of the magnetic body constituting the core are led to the rear side of the magnetic body described above through the throughholes linked as described above, respectively, to effect necessary connections.

Further, in the first rotary magnetic head device and a rotary transformer used therefor described above, in at least one of the rotor core and the stator core of the rotary transformer described above the cross sectional shape of the throughholes disposed in the thickness direction of the soft ferrite body, which is the magnetic body constituting the core, is rectangular or at least one side of the cross sectional shape is linear.

In the first rotary magnetic head device and a rotary transformer used therefor described above, in at least one of the rotor core and the stator core of the rotary transformer described above the throughholes stated above are disposed in a groove formed in a part where no spiral conductor is disposed, which is bank portions constituting the two sides of the groove, in which the spiral conductor is disposed, within a circular portion constituting a main magnetic circuit.

Still further, in a second rotary magnetic head device and a rotary transformer used therefor according to the present invention, in either one or both of a rotor core and a stator core of the rotary transformer described above a hole is formed in the thickness direction of a disc-shaped magnetic body constituting the core therein, at the central portion of which a dividing plate made of a non-magnetic substance having a thermal expansion coefficient, which is close to the thermal expansion coefficient of the magnetic substance within a region of 5%, is located so as to divide the throughhole stated above into two small holes and the starting and the ending extremity of a conductor acting as a coil formed on the surface of the magnetic body constituting the core are led to the rear side of the magnetic body described above through the small holes, respectively, to effect necessary connections.

Still further, in a third rotary magnetic head device and a rotary transformer used therefor according to the present invention, in either one or both of a rotor core and a stator core of the rotary transformer of the rotary magnetic head device described previously two holes independent from each other are formed in the thickness direction of a disc-shaped magnetic body constituting the rotary transformer therein, and in order that the size of the depth of the holes is smaller than 1 mm, when the starting and the ending extremity of a conductor acting as a coil formed on the surface of the disc-shaped magnetic body constituting the core are led to the rear side of the disc-shaped magnetic body described above through the different throughholes, respectively, to effect necessary connections, recess portions are formed at the places corresponding to the positions of the holes on the rear side of the disc-shaped magnetic body described above. That is, when the size of the depth of the holes is smaller than 1 mm, magnetic field components generated by the lead passing therethrough are reduced to such a degree that they have no undesirable influence.

Still further, in a fourth rotary magnetic head device and a rotary transformer used therefor according to the present invention, in the third rotary magnetic head device the disc-shaped magnetic body described above is reinforced by disposing reinforcing materials made of a non-magnetic substance having a thermal expansion coefficient, which is close to the thermal expansion coefficient of the magnetic substance within a region of 15%, in the recess portions formed at the places corresponding to the positions of holes on the rear side of the disc-shaped magnetic body described above.

Still further, in the third and the fourth rotary magnetic head device described previously according to the present invention, for the disc-shaped magnetic body described above, in which the nonmagnetic materials are disposed in a space excavated or formed therein, the magnetic body portion and the non-magnetic material portions are formed simultaneously in one body by the injection molding.

Finally, in either one or both of a rotor core and a stator core of a fifth rotary magnetic head device and a rotary transformer used therefor according to the present invention, a conductor disposed on the surface of the core stated above is formed at least by the photolithographic technique and when necessary connection of the starting and the ending extremity of the conductor formed as a coil with a conductor disposed on the rear surface as the lead is effected through throughholes, the depth of grooves, in which the conductors described above are disposed, is specified to have a value between 0.05 mm and 0.15 mm. That is, when the grooves are 0.05 mm to 0.15 mm deep, when applying adhesive for adhering the conductors within the grooves, small a quantity application is made possible by screen printing, etc. Therefore, even if the conductors stated above are adhered under pressure thereon, no adhesive is forced out outside of the grooves and it is possible to control the thickness of the adhesive by an order of 0.01 mm.

Now the action of the rotary transformer according to the present invention will be explained.

Signals are transmitted and received between the conductors for the coils disposed in the grooves formed in the surface portions of the magnetic bodies (rotor core and stator core), which are opposite to each other, in the rotary transformer. It is shown in a review "National Technical Report" Vol. 18, No. 4, Aug. 1972 (Sakata, Tanaka) and published by Matsushita Denki Sangyo Co., Ltd., that the number of turns of the conductors for the coils has an optimum value depending on various constants in the magnetic heads and electric circuits connected therewith.

The merit of the characteristics of the rotary transformer can be represented by the coupling coefficient K between the rotor coil and the stator coil. This coupling coefficient is expressed by the following equation (1):

$$K = \sqrt{1 - l/L} \tag{1}$$

where l represents the leakage inductance and L the combined inductance.

As it can be understood from this equation, the coupling coefficient and the signal transmission efficiency are increased if the leakage inductance l is reduced.

The presence of a magnetic body having a high permeability in the conductor path contributes to the stray L component. However, for a lead portion corresponding to the starting and the ending portion of the conductor for the coil, a part corresponding to the path through the throughholes formed in the core magnetic bodies acts as a leakage inductance l, which is an ineffective component. That is, contrarily to the fact that the leakage inductance l varies, depending on how the starting and the ending lead are drawn out, the combined inductance doesn't vary depending thereon, but it is constant.

Therefore, if the lead portion conductors for the starting and the ending extremity are drawn out through throughholes independent from each other formed in the magnetic bodies, the leakage inductance l increases proportionally to the part corresponding to the length of these throughholes.

For this reason, in the first rotary transformer according to the present invention, the two throughholes composed of the magnetic substance are linked with each other so as to act as if they were magnetically one throughhole, although their cross section is approximately square-barbell-shaped. Since the directions of the currents flowing through the two lead portions are opposite to each other, due the fact that both the lead portions corresponding to the starting and the ending portion of the winding of the coil conductor are drawn out through the same throughhole, the inductance components thereof cancel each other and therefore it is possible to reduce remarkably influences of the lead of a length corresponding to the thickness of the magnetic body (length the of the throughhole) on the leakage inductance.

In the second rotary transformer according to the present invention, the lead portions corresponding to the ending portion and the starting portion of the winding of the coil conductor described above, which are not insulated, can be drawn out through the same throughhole by disposing a partitioning member made of a non-magnetic substance, which prevents a short-circuit of the starting and the ending portion of the coil conductor, within the one throughhole formed in the core made of a magnetic substance to divide the throughhole stated above into two small holes. Therefore, similarly to the first rotary transformer, the inductance components thereof cancel each other and thus it is possible to reduce remarkably influences of the lead of a length corresponding to the thickness of the magnetic body (length the of the throughhole) on the leakage inductance. According to the present invention, owing to the fact that the difference between the thermal expansion coefficient of the partitioning member made of the non-magnetic substance used for the partition and that of the core made of the magnetic substance is smaller than 15%, it is possible to form and sinter simultaneously the non-magnetic material and the magnetic core by the injection molding technique at the fabrication. Further damages such as deformation, generation of cracks, etc., due to remaining stress, etc., produced between the two members after the sintering are not produced, which is desirable.

In the third and the fourth rotary transformer according to the present invention, the magnitude of the leakage inductance l described previously can be made small by the fact that the length of the throughhole is as small as possible, concretely speaking smaller than 1 mm.

In the fifth rotary transformer according to the present invention, the depth of grooves, in which there are disposed the spiral conductors on the surfaces opposite to each other of the rotor core and the stator core to effect the transmission of signals and/or the lead portion conductors electrically connected with the starting and the ending portion of the spiral conductors described above and located on the surfaces opposite to those described above which are opposite to each other, is specified as a value between 0.05 mm and 0.15 mm. In this way, when adhesive for adhering the conductors is applied in the grooves, a small quantity application is made possible by screen printing, etc. In this way, even if the conductors stated above are adhered under pressure thereon, no adhesive is forced out of the grooves and it is possible to control the thickness of the adhesive by an order of 0.1 mm.

In other words, this is because it is difficult to apply adhesive with a high precision within the grooves by the screen printing, etc., on a recessed surface having grooves deeper than 0.15 mm. Further, although it decreases DC resistance to increase the thickness of the conductor, which is useful for decreasing the transmission loss in a low frequency band below 1 MHz, the thickness thereof made by metallizing, etching, etc., which are usual fabrication methods for forming the coil, is about 0.03 mm. From this relation between the thickness of the conductor and that of the adhesive layer it is understood that the minimum depth of the grooves, such that the conductors disposed in the grooves don't protrude from the surface of the cores stated above, is 0.05 mm.

Furthermore, in general, it is good from the point of view of characteristics such as the coupling coefficient, etc., to make the grooves shallower to increase the space factor of the conductor coil in the grooves and it defines deteriorations in the characteristics to specify the upper limit of the depth of the grooves.

Still further the fact that the conductors don't protrude from the surfaces of the cores makes it possible to control the interval between the cores described above which are opposite to each other with a high precision and to prevent short-circuit defects due to the contact between the conductors and the drum when the cores are mounted on the fixed drum, the rotating drum, etc.

From the above description it can be understood that the fact that the depth of the grooves is specified to be greater than 0.05 mm and smaller than 0.15 mm makes it possible to obtain a rotary transformer having a high reliability, a high productivity and a high performance.

According to the present invention, since it is possible to fabricate simultaneously a plurality of coils in the rotor and the stator by sputtering, evaporation, the photolithographic technique, etc., without worsening the coupling coefficient in the rotary transformer, the fabrication steps of forming windings for the coils and inserting and adhering the windings for the coils in the grooves formed in the magnetic cores are unnecessary.

In particular, the effect of the decrease in the number of fabrication steps becomes greater with an increasing number of conductors of coils and short rings, because it is possible to form and adhere simultaneously a plurality of coils and short rings in the rotor and the stator for every surface. Further, since fluctuations in the work of burying the coils in the grooves formed in the magnetic cores are removed, the grooves can be made shallower.

Furthermore, differing from the related art coil indicated in FIGS. 16A and 16B in the electrical characteristics, since there exist almost no adhesive between the different coils and between the coils and the magnetic cores, the stray capacitance between the coils due to the dielectric constant of the adhesive is small and the resonance point with the inductance component of the rotary transformer is displaced towards a higher frequency. For this reason it is possible to widen the frequency band for the signal transmission as the rotary transformer.

This point will be explained, referring to FIG. 14.

FIG. 14 shows characteristic curves comparing those obtained according to the present invention with those obtained by a prior art example, in which the ordinate represents the overall inductance (sum of inductance of the magnetic heads, inductance on the rotor side and inductance on the stator side) and the abscissa represents the frequency.

Further, owing to the method for forming the coils, since the distance between the coil conductors is great, also from this point of view the device according to the present invention has a shape factor for reducing stray capacitance between the coils and therefore it is possible to widen further the frequency band.

For reference, the capacitance between coils is given by the following formula (2);

$$C = \pi\epsilon / \ln\{(D-r)/r\} \qquad (2)$$

where
$\epsilon$ = dielectric constant = $\epsilon_0 \times \epsilon r$
$\epsilon_0$ = dielectric constant in vacuum
D = coil pitch and
r = radius of conductor.

BRIEF DESCRIPTION OF THE DRAWINGS

These and other objects and advantages of the present invention will become apparent by reference to the following description and accompanying drawings wherein:

FIGS. 1A and 1B are perspective views showing a principal part of the rotary transformer, which is an embodiment of the present invention, FIG. 1A indicating a groove and throughholes in a rotor core, FIG. 1B the throughholes, in which leads are disposed;

FIGS. 3A, 3B, 3C, 3D and 3E are perspective views showing cross sections of the principal part in various embodiments of the present invention, FIGS. 3A, 3B and 3E indicating different embodiments of a linking slit, FIGS. 3C and 3D different embodiments of the throughholes.

FIG. 4 is a perspective view showing a cross section of the principal part viewed from the opposite side (rear side) of a rotor core indicated in FIGS. 1A and 1B;

DESCRIPTION OF THE PREFERRED EMBODIMENTS

Figure 2:
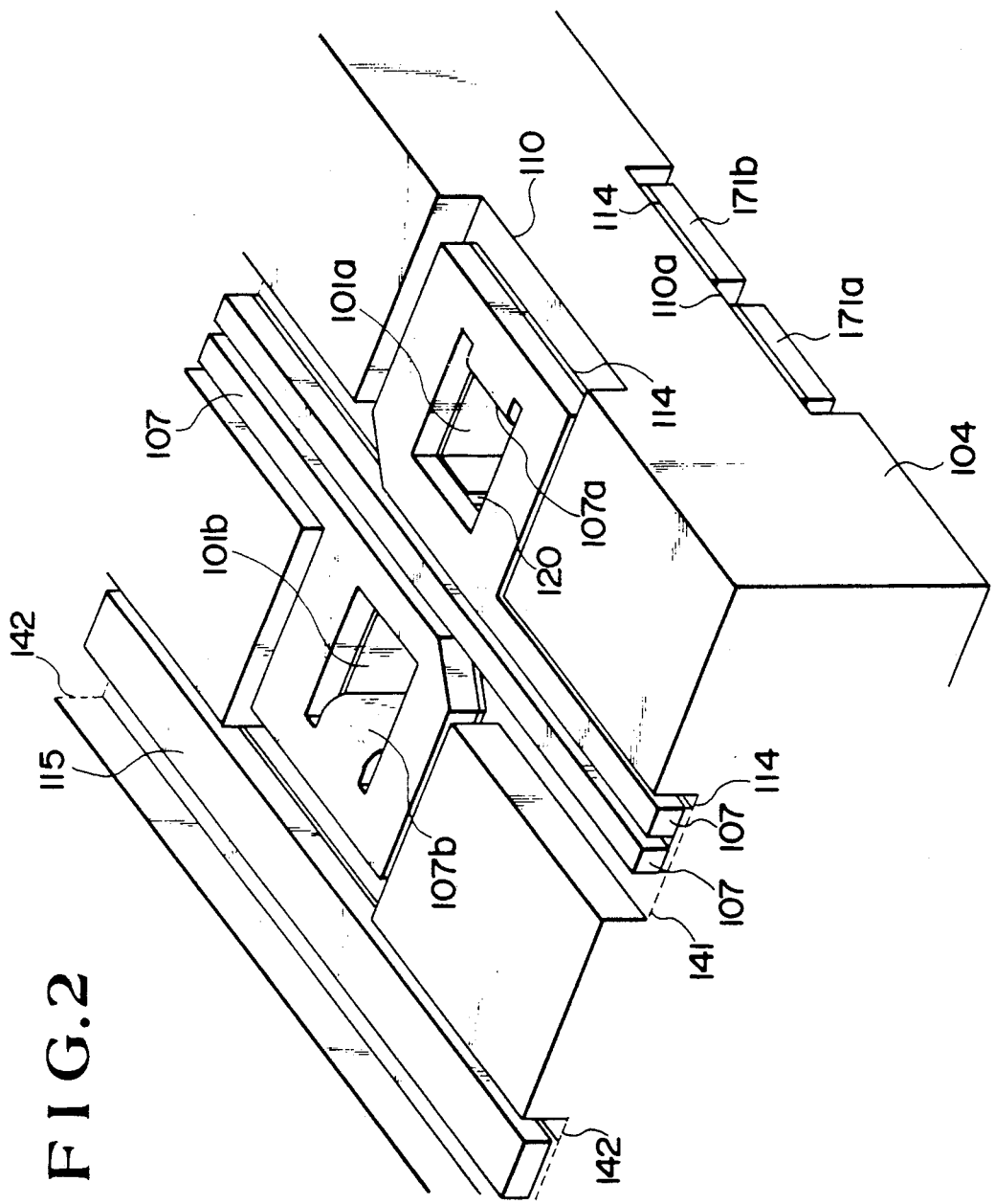
FIG. 2 is a perspective view showing the rotor core, in which the starting and the ending lead are connected with leads for external connection on the rear surface of the rotary transformer.

The preferred embodiments of the present invention will be explained below, referring to the drawings.

FIGS. 1A and 1B are perspective views showing a throughhole formed in a rotor core 104, which is the principal part in an embodiment of the present invention.

In FIG. 1A, reference numeral 141 is a groove for disposing a coil conductor formed in the rotor core 104 made of a magnetic substance; 142 is a groove for a short ring; 101 is a throughhole, through which the starting and the ending lead of the coil conductor are drawn out from one side of the core to the other side; and 120 is a linking slit having a width, which is smaller than the outer diameter of throughholes 101a and 101b into which the throughhole 101 described above is divided.

The throughhole 101 is divided into two throughholes 101a and 101b linked magnetically by this linking slit 120 and independent from each other in the aspect of the mechanical function. The starting and the ending lead of the coil conductor pass through these two throughholes 101a and 101b, respectively. This aspect is shown in FIG. 1B.

In FIG. 1B, 107 indicates the coil conductor, 107a being the starting lead, 107b being the ending lead. It will be recognized from the figure that the starting lead 107a is formed so as to be bent into the throughhole 101a and the ending lead 107b is formed so as to be bent into the throughhole 101b.

The coil conductor 107 is formed on another member by metallizing, etching, etc. utilizing the photolithographic technique. The starting lead 107a and the ending lead 107b can be formed simultaneously in the same way. On the other member are formed simultaneously a plurality of coil conductors and short rings, which are fixed under pressure to the core 104 at a place where adhesive 114 is applied with a high precision by screen printing, etc., within the groove 141. Thereafter the other member is removed and the state indicated in FIG. 1B is realized.

In this way, since the starting lead 107a and the ending lead 107b utilize a same throughhole 101 in common from the magnetic point of view, inductances of the two lead portions cancel each other and therefore don't worsen the coupling coefficient of the rotary transformer. In addition, the linking slit 120 linking the two throughholes 101a and 101b traverses the coil conductor to form a place where the conductor 107 is not adhered. However, since it is narrow, it doesn't impair the adhering force of the coil conductor 107 to the core 104.

In the present embodiment, as indicated in FIGS. 1A and 1B, the throughholes 101a and 101b are disposed at places outside of the ring-shaped groove 141, where the spiral conductor (coil) described previously is disposed, the places being on both the sides thereof and adjacent thereto, the spiral conductors described above being not disposed at the places. Therefore, since it is possible to increase the width of the spiral conductor, for the multichannel type, by which a plurality of coils are disposed, it is possible to suppress the DC resistance, which can give rise to a problem in particular on the rotor side, to a low value and to reduce the transmission loss, which can give rise to a problem in particular in the low frequency band below 1 MHz described previously.

Further, these throughholes 101a and 101b are disposed within a groove formed so as to separate ring-shaped bank portions 190a and 190b forming the two sides of the groove 141 constituting the main magnetic circuit. In this way, since it is possible to form the conductor so as to be wide in the neighborhood of the starting and the ending lead, it is possible to secure a satisfactory adhering area in the neighborhood of the bent conductor, when conductor foils corresponding to the starting and the ending lead are bent into the throughholes. Therefore, it is possible to prevent that the conductor in the neighborhood thereof is deformed and peeled off and to obtain a rotary transformer having a high reliability, in which the conductor doesn't protrude from the groove.

Although, in the above explanation, the coil conductor 107 on the rotor core 104 side has been explained, it is a matter of course that this can be executed also on the stator core side. This is true also for lead conductors 171a and 171b disposed on the core surface opposite to the surfaces opposite to each other, on which the coil conductors 107 are disposed, which lead conductors 171a and 171b are connected with the starting lead 107a and the ending lead 107b of each of the coil conductors described above.

FIG. 2 is a perspective view showing a cross section of the principal part of the embodiment of the present invention.

FIG. 2 represents the rotor core 104, in which the starting lead 107a and the ending lead 107b indicated in FIG. 1B are connected with the leads 171a and 171b for the connection to the exterior. Here 141 is the groove formed on one side of the core 104; 142 is the groove, in which the short ring 115 adjacent thereto is disposed; 110a is a groove for drawing out the lead to the exterior, formed on the other side of the core 104 in the direction crossing the groove described above; 107 is a coil conductor disposed in the groove 141 and adhered thereto; 101a and 101b are the throughholes linked with each other by the linking slit 120 in the core; 107a is the starting lead passing through the throughhole 101a; 107b is the ending lead passing through the throughhole 101b; and 171a and 171b are the lead conductors for the connection to the exterior disposed and adhered in the groove 110a.

The lead conductors 171a and 171b are connected electrically by soldering, etc. with the starting lead 107a and the ending lead 107b, which are conductive foils bent to the interior of the throughholes 101a and 101b, respectively.

According to the present embodiment, the number of fabrication steps of the core for separating the throughholes by disposing the non-magnetic material between the throughholes for drawing out the lead is reduced. Owing to the fact that the throughholes for drawing out the lead are linked with each other, they behave as if they were magnetically one throughhole and thus the coupling coefficient in the rotary transformer is not worsened.

Further, since the throughholes are utilized for drawing out the lead, a plurality of conductors for the rotary transformer can be formed simultaneously only by disposing one conductor layer for every surface and thus it is possible to construct a rotary transformer having a high reliability, in which the strength for holding the conductors adhered to the surface of the core is not lowered by using a small width of the linking slit linking the throughholes.

Furthermore, in the embodiment indicated in FIGS. 1A, 1B and 2, the depth of the groove 141 for the coil conductor and the groove 110a for the lead conductors is specified to be between 0.05 mm and 0.15 mm.

The reason why the depth of the grooves is specified as described above is as follows. Concerning the method of applying the adhesive 114 for adhering the conductors, as described previously, by the method used usually heretofore, by which a dispenser is utilized, it is impossible to control the applied quantity by an order of 0.01 mm. Therefore it cannot help utilizing printing techniques such as the screen printing, etc. When the adhesive is applied on a surface having an unevenness, the difference in the height, for which the control described above of the applied quantity is possible, is about 0.15 mm.

Further, from the fact that the thickness of the conductors is about 0.03 mm, the condition for keeping completely the conductors within the groove is that the groove should be deeper than 0.05 mm, taking the thickness of the adhesive into account.

From the above description, when the upper limit of the depth of the groove is defined, the worsening of the coupling coefficient in the rotary transformer can be defined.

In general, of course, it is desirable that the coupling coefficient of the rotary transformer required for a high performance rotary cylinder is as high as possible. However, in practice, it is thought that it should be greater than 0.95. The coupling coefficient in a prior art rotary transformer, in which polyurethane wire having a conductor diameter of 0.20 mm$\phi$ is used; the groove is about 0.5 mm deep, and the distance between the cores of the transformer is 0.05 mm, is around 0.96. On the other hand, when the core shape according to the present invention is adopted, the coupling coefficient is around 0.98 for a distance of 0.05 mm between the cores of the transformer. Therefrom, it will be understood that improvement in the characteristics is remarkable.

Although, in the above embodiment, an example of the coil groove in the embodiment indicated in FIGS. 1A and 1B has been explained, this structure of the coil groove can be suitably applied also to the embodiments described later.

According to the present embodiment, by defining the upper limit of the depth of the grooves formed in the magnetic cores, it is possible to control the applied quantity with a high precision by the screen printing technique, etc., at the application of the adhesive in the grooves formed in the magnetic cores, and to restrict fluctuations in the coupling coefficient in the rotary transformer, which makes it possible to obtain a rotary transformer having a great coupling coefficient and a high performance.

Furthermore, by defining the lower limit of the depth of the grooves formed in the magnetic cores, it is possible to obtain a rotary transformer having a high reliability, in which the conductors formed at least by the photolithographic technique and disposed in the grooves don't protrude from the grooves.

Figure 3A:
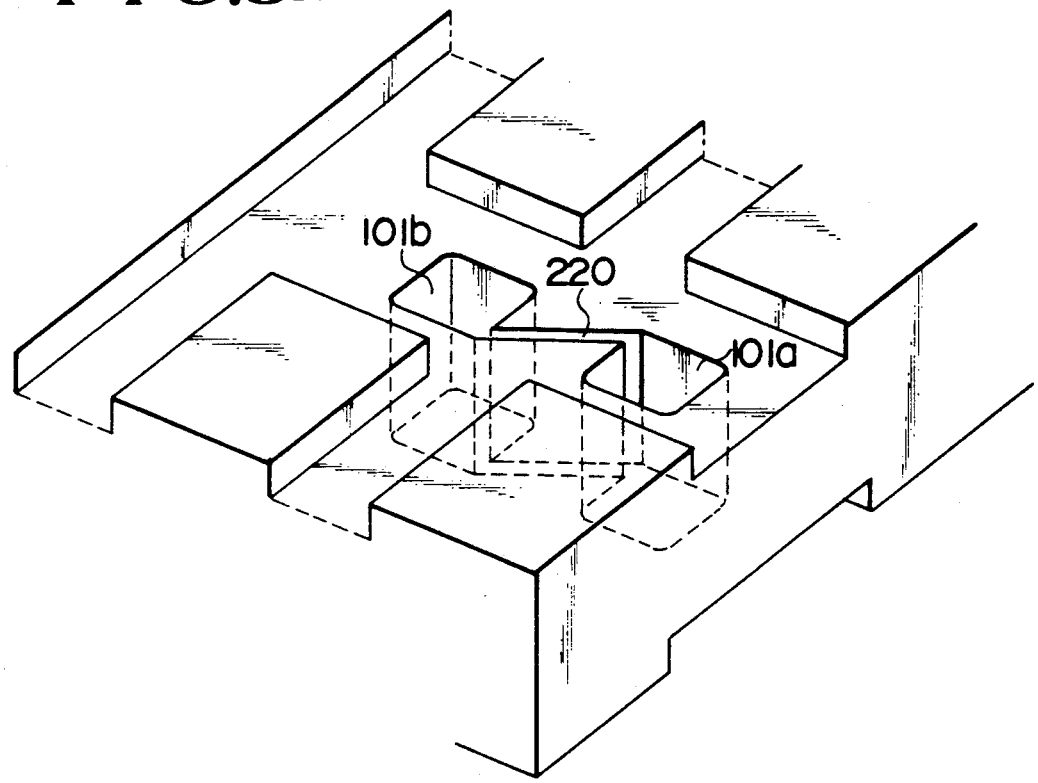
Figure 3B:
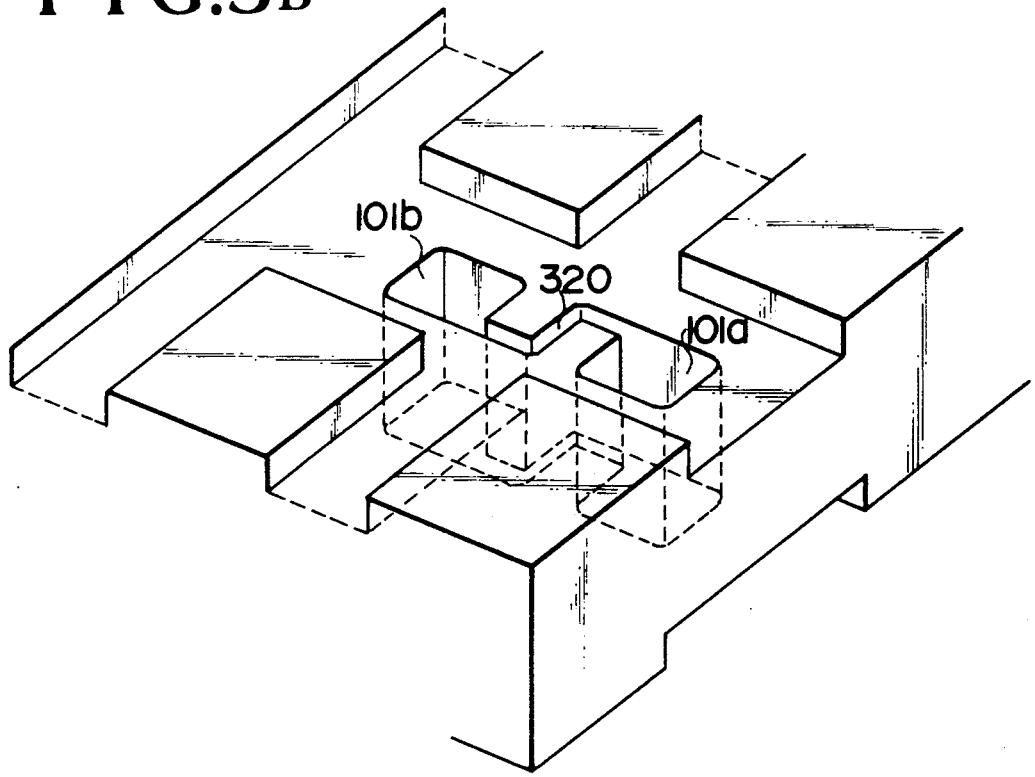

FIGS. 3A, 3B, 3C, 3D and 3E are perspective views showing cross sections of the principal part of other different embodiments of the present invention. In the embodiment indicated in FIGS. 1A, 1B and 2, the throughholes 101a and 101b have a rectangular cross section and the linking slit 120 is disposed approximately at the central portion thereof. On the contrary, FIGS. 3A, 3B and 3E show examples, in which the linking slit is disposed differently. In the embodiment indicated in FIG. 3A the linking slit 220 links obliquely and linearly two corner portions of the throughholes 101a and 101b, while in the embodiment indicated in FIG. 3B the linking slit 320 links them in a hook shape.

In the embodiment indicated in FIG. 3E, the linking slit 420 links the central portions of the throughholes 101a and 101b and in addition another throughhole 420a having an elliptic cross section is further disposed at the central portion of the linking slit 420.

Figure 3C:
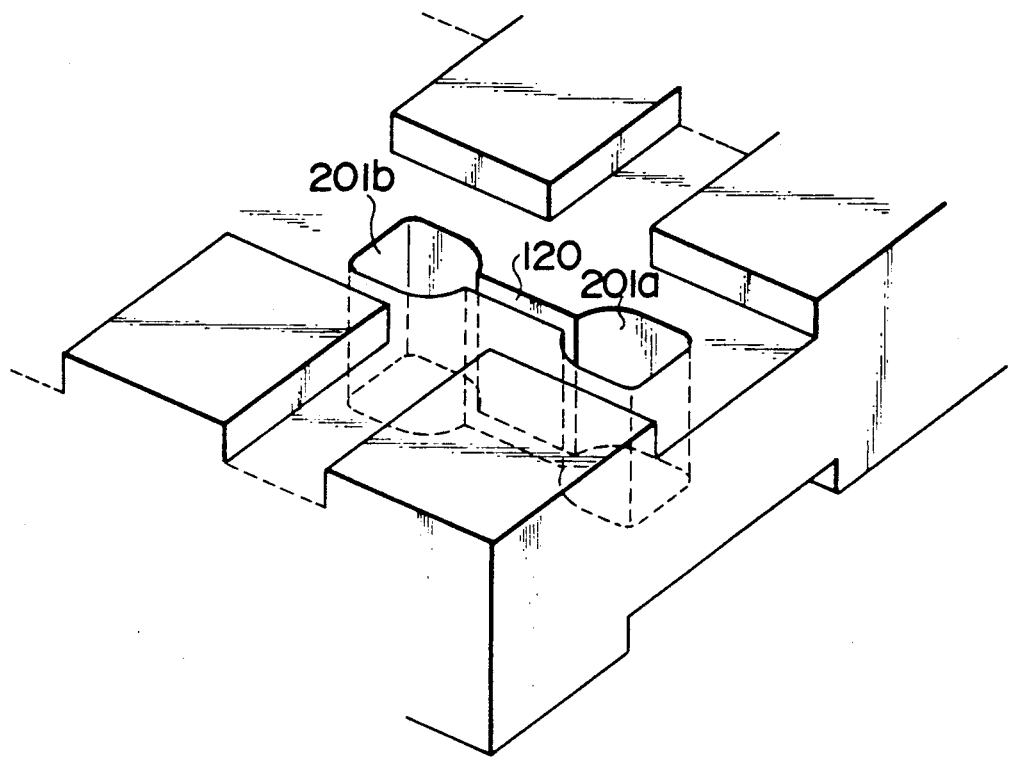
Figure 3D:
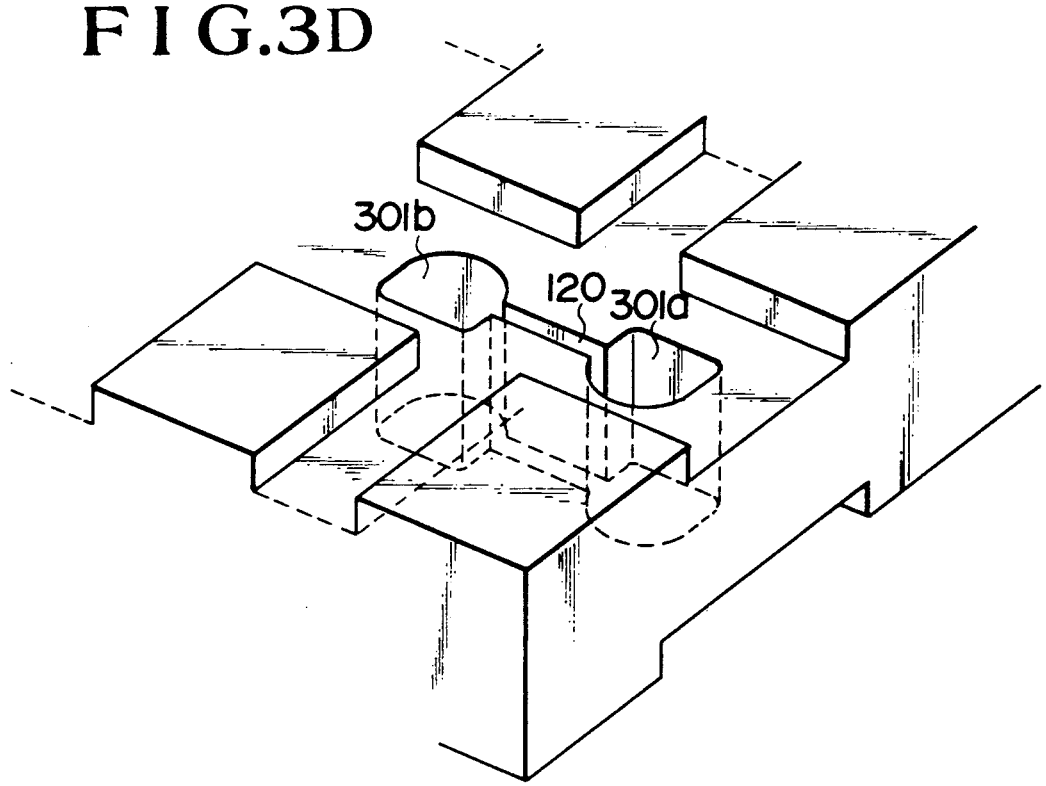

Contrarily to the fact that the throughholes indicated in FIGS. 1A and 1B have a rectangular cross section, in the embodiments indicated in FIGS. 3C and 3D they have other shapes. That is, in FIG. 3C, the cross section of each of throughholes 201a and 201b is approximately a semicircle, whose one side is a straight line and the linking slit is formed so as to connect the summits of the two semicircles, which are opposite to each other and, in FIG. 3D, the linking slit 120 is formed so as to connect the side portions of the two approximate semicircles of throughholes 301a and 301b.

Now it will be explained why the cross sectional shape of the throughholes should be specified, taking the embodiment indicated in FIG. 2 as an example. In the case where the conductive foils (the starting lead 107a and the ending lead 107b) corresponding to the parts led to the throughholes 101a and 101b of the conductors 107, 171a and 171b adhered in the grooves 141 and 110a formed in the surface portion of each of the cores 104 are bent into the throughholes, since at least one side of each of the throughholes, exposed on the surface of the core is straight, the bending of each the conductive foils can be effected along the side described above, which facilitates the bending and improves the precision of the bending. In this way the fabrication yield relating to the electrical connection is increased. Further, since the conductors in the neighborhood of the bending are adhered around the throughholes 101a and 101b, it can be prevented that the conductors are peeled off due to the stress applied to the coil conductor at bending the starting lead 107a and the ending lead 107b.

Still further, as described previously, since the bending is easy, the conductive foils are not broken, and the precision in the bending is increased, the length of the conductors in the throughholes is uniform and it is possible to obtain a rotary transformer having a high reliability in the electrical connection of the lead portions.

FIG. 4 is a perspective view showing a cross section of the principal part viewed from the side (rear side) opposite to the surfaces, which are opposite to each other, acting as the rotary transformer indicated in FIGS. 1A and 1B in the embodiment of the present invention. In FIG. 4, 171a and 171b are the lead conductors disposed in the groove 110a and adhered thereto by means of the adhesive 114. The lead conductors 171a and 171b are connected with the starting lead 107a on the side of the lead conductor; which has passed through the throughhole 101a and the ending lead 107b on the side of the lead conductor, which has passed through the throughhole 101b.

Although, in the above description, the rotor core side has been explained, it is a matter of course that the same can be executed also for the stator core side.

As the material of the cores for the rotary transformer, generally Ni—Zn or Mg—Zn ferrite is used. Since these have high resistivities, it is naturally unnecessary to dispose insulating members between the cores and the conductors.

Figure 5A:
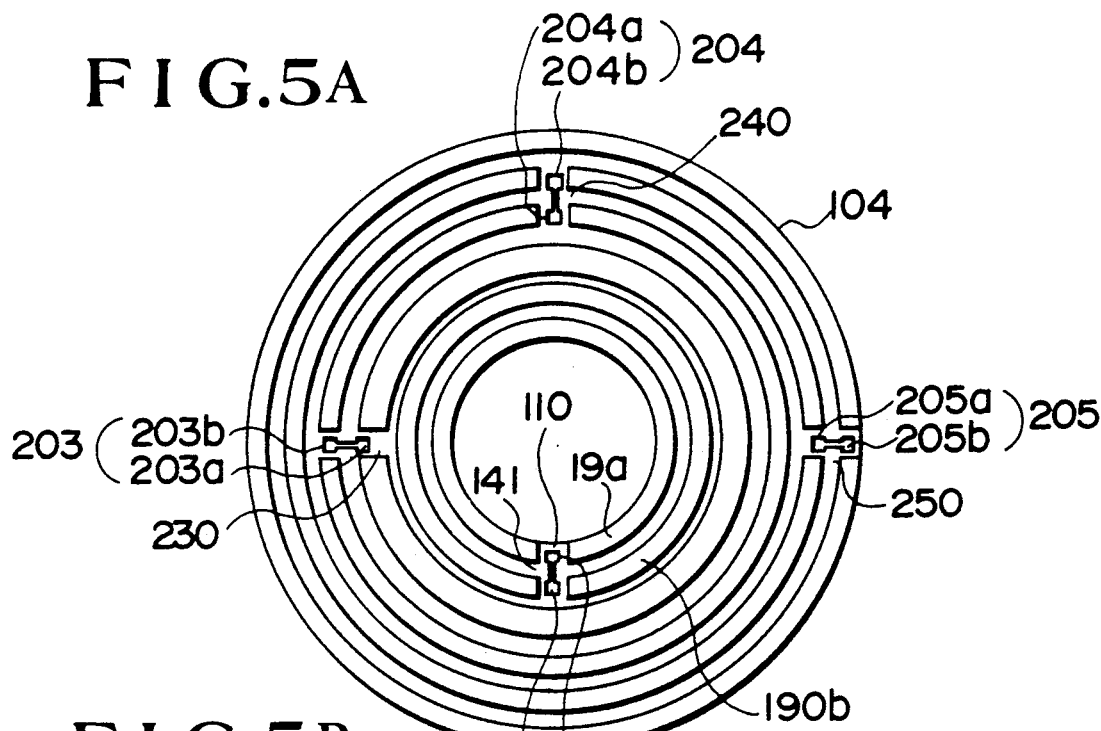
FIGS. 5A, 5B and 5C show the rotor core as a whole in an embodiment of the present invention, FIG. 5A being a plan view, FIG. 5B being a cross sectional view, FIG. 5C being a back view.
Figure 5B:
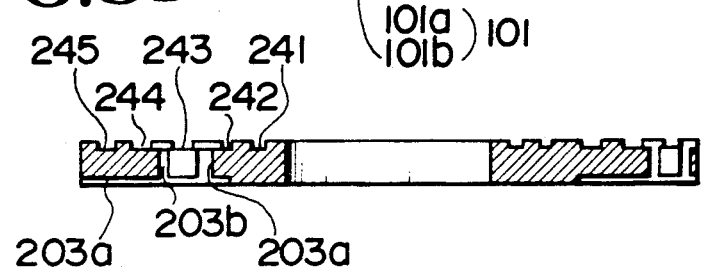
Figure 5C:
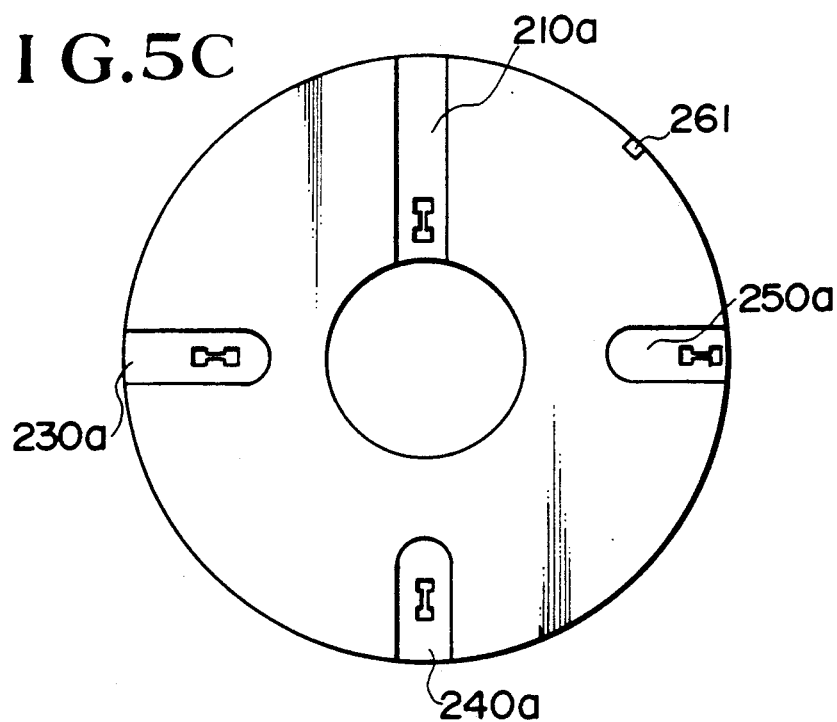

FIGS. 5A, 5B and 5C show the rotor core as a whole in an embodiment of the present invention as explained, referring to FIGS. 1A and 1B; FIG. 5A being a plan view, FIG. 5B being a cross sectional view, FIG. 5C being a back view.

Figure 5D:
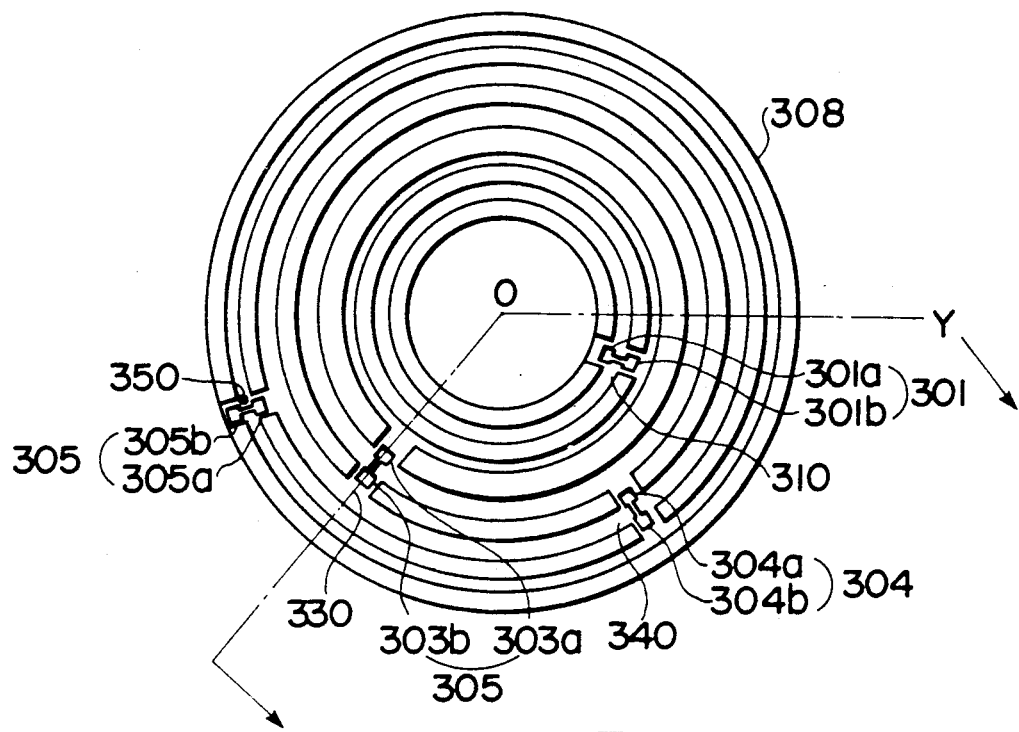
FIGS. 5D, 5E and 5F show the stator core as a whole in another embodiment of the present invention, FIG. 5D being a plan view, FIG. 5E being a cross sectional view, FIG. 5F being a back view.
Figure 5E:
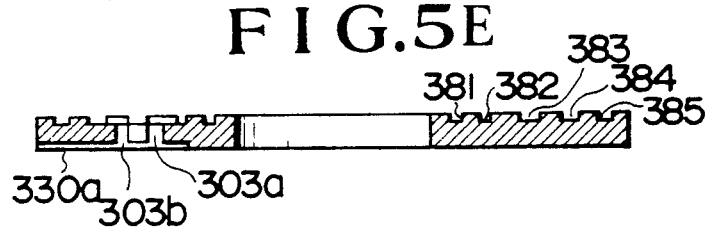
Figure 5F:
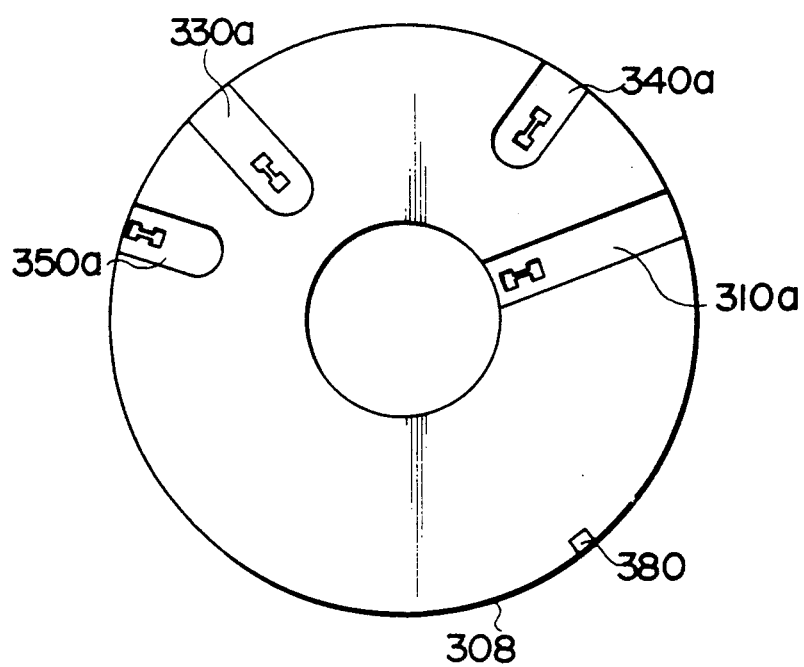

FIGS. 5D, 5E and 5F show the stator core as a whole in the embodiment of the present invention as explained, referring to FIGS. 1A and 1B, FIG. 5D being a plan view, FIG. 5E being a cross sectional view, FIG. 5F being a back view.

These cores, in which the throughhole portions have such a strange shape, can be obtained relatively easily by using the injection molding method for the rotary transformer disclosed in JP-A-61-84006.

Figure 6:
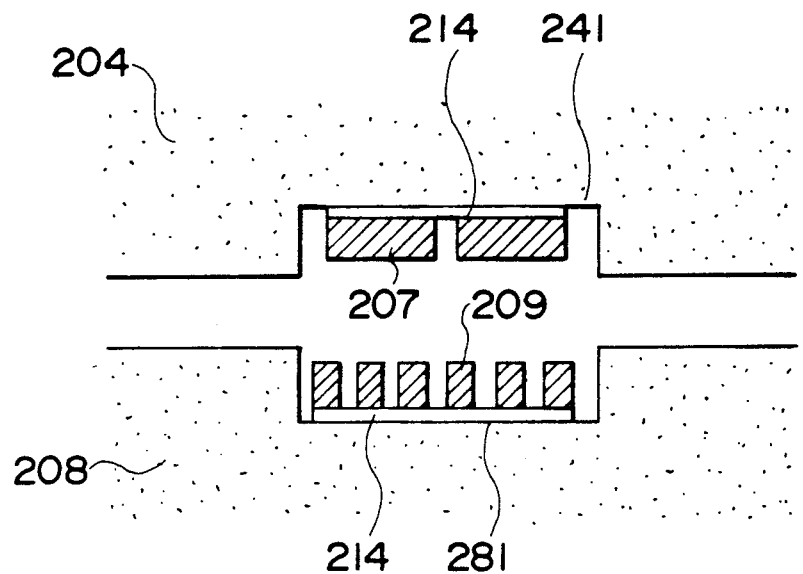
FIG. 6 is a cross sectional view of the principal part of an embodiment of a rotor core and the stator core, in which a spiral coil is formed by the photolithographic technique.

FIG. 6 is a cross sectional view of the principal part in the state where the rotor core 204 and the stator core 208 constituting the rotary transformer according to the present invention are opposite to each other, which is an example, in which a plurality of conductors such as spiral coils 207, 209, etc. are formed simultaneously in one layer by metallizing, etching, etc. using at least the photolithographic technique and adhered on the surfaces of the cores.

Figures 7A, 7B:
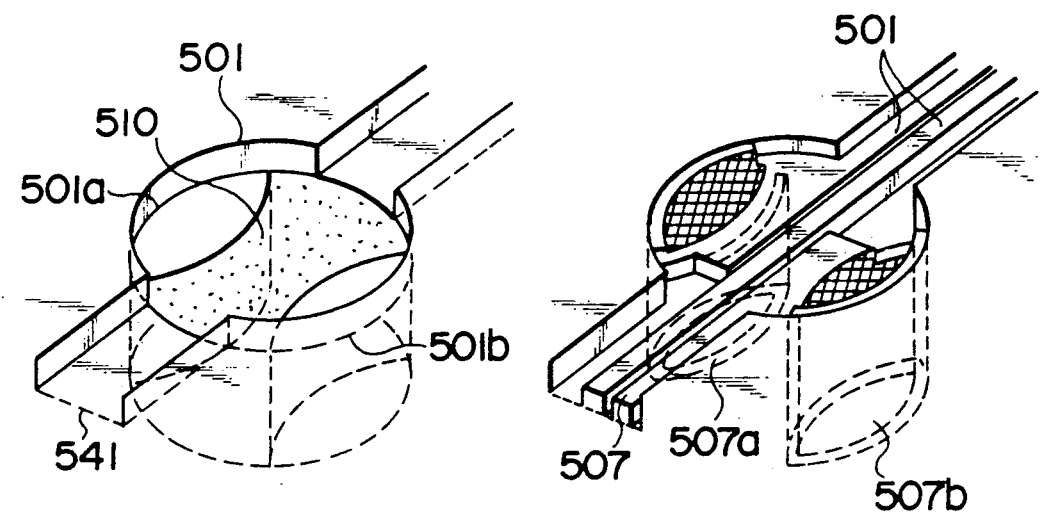
FIGS. 7A and 7B are perspective views showing the principal part of the rotor core relating to still another embodiment of the present invention, for which a partitioning member having a predetermine thermal expansion coefficient is disposed in a throughhole in the rotor core before and after the disposition of the coil conductor, respectively.

FIGS. 7A and 7B are perspective views showing a throughhole, which is the principal part of a second rotary coil according to the present invention.

In FIG. 7A, 541 is a groove for disposing a coil conductor formed in the rotor core made of a magnetic substance; 501 is a throughhole having e.g. a diameter of about 1 mm for leading the starting lead or the ending lead of the coil conductor from one side to the other of the core; and 510 is a non-magnetic partitioning member such as a ceramic material, the thermal expansion coefficient of which is close to the thermal expansion coefficient of the magnetic substance constituting the rotor core within a region of 15% thereof. That is, the throughhole 501, which is originally one hole, is divided into two small holes 501a and 501b by disposing the non-magnetic partitioning member 510 at the central portion of the throughhole. In this way the starting lead and the ending lead of an uninsulated conductor can be made to pass separately through these two small holes 501a and 501b, respectively.

In FIG. 7B, 507 is the coil conductor disposed in the groove 541, 507a being the starting lead, 507b being the ending lead. It will be seen that the starting lead 507a is formed in the small hole 501a as indicated by double hatch and that the ending lead 507b is formed in the small hole 501b similarly as indicated by double hatch.

For this rotor core the non-magnetic partitioning member and the magnetic core can be formed simultaneously by the injection molding method, e.g. as follows.

Raw material for the non-magnetic partitioning member is located previously at a predetermined position in a mold for forming the rotor core. Thereafter raw material for forming the magnetic core, prepared by adding binder to soft ferrite magnetic powder, is injected in the mold stated above to fabricate a crude core body having the coil grooves. This crude core is sintered at a predetermined temperature to form the magnetic core having the partitioning member after having degreased it at another predetermined temperature. Since the fabrication method for fabricating the rotary transformer by the injection molding technique is disclosed in JP-A-61-84006, explanation in detail thereof will be omitted.

As non-magnetic partitioning substances having a thermal expansion coefficient, which is close to the thermal expansion coefficient of the rotary transformer within a region of 15%, e.g., the following substances are conceivable. In general, as the substance for the core for the rotary transformer Ni—Zn or Mg—Zn ferrite is used, as described previously. If the partitioning member is made of a ceramic material, whose main raw material is silica or alumina, it can have a difference in the thermal expansion coefficient in a region of 15%.

The difference in the thermal expansion coefficient therebetween should be restricted to a region of 15% for the following reason. The probability, with which cracks are produced in the transformer due to thermal stress at fabricating simultaneously the core made of ferrite for the rotary transformer and the partitioning member made of a ceramic material by sintering, varies, depending on where the partitioning member is located (i.e. whether it is located at the central portion or at the peripheral portion of the core). However, in general, the probability is high, when the difference in the thermal expansion coefficient exceeds 15%. This is the reason why it is restricted thereto.

The coil conductor 507 is formed in the groove 141 including on the non-magnetic partitioning member 510 by a technique such as metallizing, sputtering, evaporation, photolithography, etc. The starting lead 507a and the ending lead 507b are fabricated also simultaneously.

In this way, since the starting lead 507a and the ending lead 507b pass through a same throughhole 501 in common, the inductances of the two lead portions cancel each other and therefore they don't worsen the coupling coefficient of the rotary transformer. In addition, since a material such as a ceramic material having a thermal expansion coefficient, which is close to the thermal expansion coefficient of the rotor core within a region of 15%, is used as the non-magnetic substance 510 separating the two small holes 501a and 501b, no cracks due to thermal stress are produced in the cores constituting the rotary transformer. Furthermore the reliability concerning the chemical stability against organic solvents, etc., and the resistance against chemical reagents is remarkably increased by using a ceramic material for the non-magnetic partitioning member located in the throughhole formed in the magnetic core, differing from a prior art rotary transformer made of resin.

Further, since the uniformity of the junction portion between the two members is significantly improved due to the fact that it is thermally stable, it is possible to make the pattern finer, when the coil is formed on the non-magnetic member, the formation of the coil in the rotary transformer becomes easier for a multi-channel type magnetic head, in which the grooves are narrow and the interval between the two coils is small.

Still further, at the fabrication it is possible to form and sinter simultaneously the nonmagnetic partitioning member 510 and the magnetic core (rotor core) by the injection molding technique to simplify the fabrication process for the rotary transformer.

Although, in the above description, the starting lead and the ending lead of the coil conductor on the rotor core have been explained, it is a matter of course that the same can be executed for the stator core.

Figure 11A:
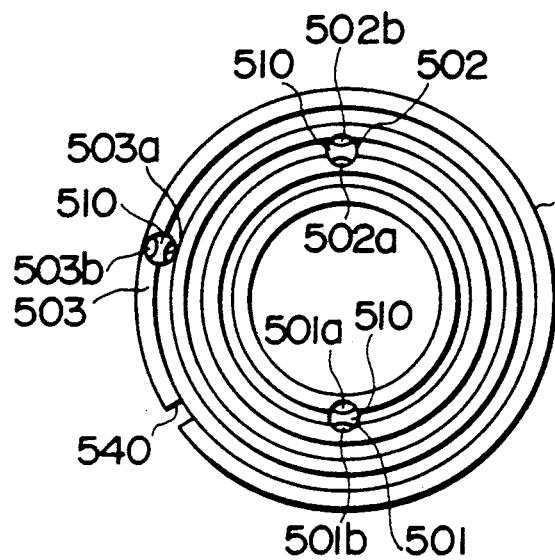
FIGS. 11A, 11B, 11C and 11D show the rotary transformer in the embodiment indicated in FIGS. 7A and 7B, FIG. 11A being a plan view of the rotor core, FIG. 11B being a cross sectional view thereof, FIG. 11C being a plan view of the stator core, FIG. 11D being a cross sectional view thereof.
Figure 11B:
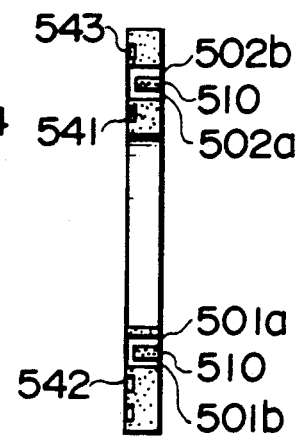

FIGS. 11A and 11B are schemes showing the rotor core in the embodiment, as explained previously, referring to FIGS. 7A and 7B, as a whole; FIG. 11A being a plan view; FIG. 11B being a cross sectional view thereof.

In these figures, it will be understood that a non-magnetic partitioning member 510 made of e.g. a ceramic material in each of the throughholes 501 and 502 so that a hole 501 is divided into two small holes 501a and 501b and the other hole 502 is divided into two small holes 502a and 502b.

Figure 11C:
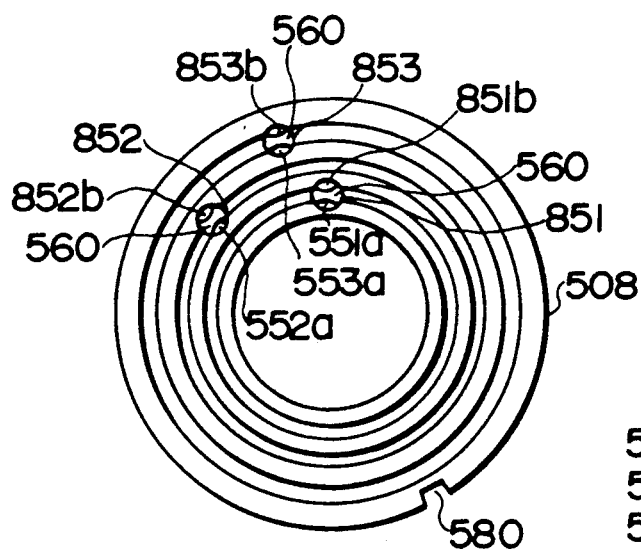
Figure 11D:
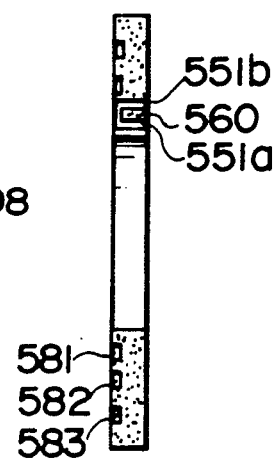

FIGS. 11C and 11D are schemes showing the stator core in the embodiment, as explained, referring to FIGS. 7A and 7B, as a whole; FIG. 11C being a plan view; FIG. 11D being a cross sectional view thereof.

It will be understood that this case is also completely identical to the case of the rotor core.

Figure 8:
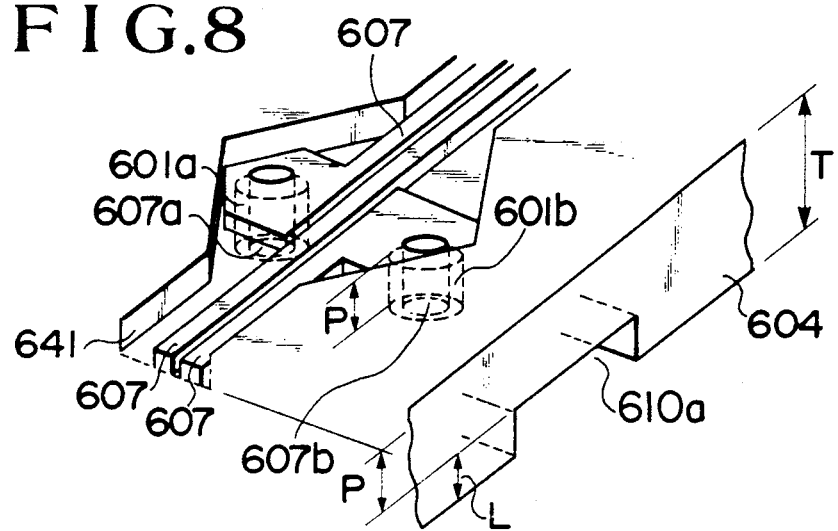
FIG. 8 is a perspective view showing the principal part of the rotor core in still another embodiment of the present invention.

FIG. 8 is a perspective view showing the principal part of still another embodiment of the present invention.

In FIG. 8, reference numeral 604 is a rotor core; 641 is the groove formed on one side of the core 604; 610a is the groove formed on the other side, i.e. the rear side of the core 604 in the direction crossing the groove 641; 607 is a coil conductor disposed in the groove 641; 601a and 601b are the throughholes formed independently from each other in the core 604; 607a is the starting lead passing through the throughhole 601a; and 607b is the ending lead passing through the throughhole 601b.

Here the groove 610a is formed so as to be located just below the throughholes 601a and 601b. They are so formed that a relation T = P + L is valid, where T represents the thickness of the rotor core 604; P the length (depth) of the throughholes 601a and 601b; and L the depth of the groove 610a.

The purpose of such a construction is to suppress the worsening of the coupling coefficient in the rotary transformer, suppressing the increase in the leakage inductance by the starting lead 607a and the ending lead 607b passing through the throughholes by defining the depth P of the throughholes 601a and 601b below a predetermined value.

That is, in the embodiment indicated in FIG. 8, since the throughholes are formed independently from each other for the starting lead 607a and the ending lead 607b, the leakage inductance is produced, corresponding to the depth of the throughholes. However it is tried by making the depth of the throughholes as small as possible to suppress the leakage inductance. Concretely speaking, the value of the depth P of the throughholes 601a and 601b should be smaller than 1 mm.

Heretofore rotor cores and stator cores having the following dimensions have been generally used for a VTR. That is, for the large size the diameter is 40 to 58ϕ and the thickness is 2.5 to 3.2 mm, and for the small size such as a VTR for a portable receiver, etc., the diameter is 30ϕ and the thickness is about 1.5 to 1.8 mm.

In order to keep the value of P under 1 mm, a method, by which the thickness T of the rotor core 604 itself is smaller than 1 mm, is also conceivable instead of forming the groove 610a. However, in this way, since the mechanical strength of the rotor core 604 itself is reduced as a whole and the value of T is determined, corresponding thereto, it is not possible to reduce the thickness thereof to a value extremely small.

Figure 9:
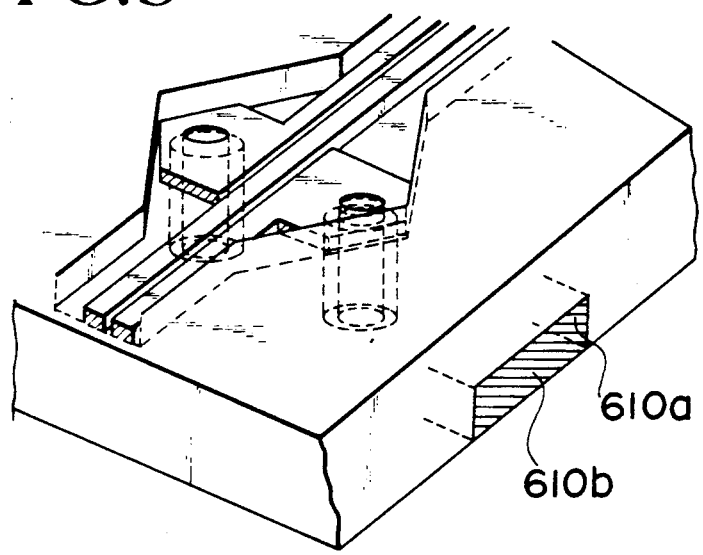
FIG. 9 is a perspective view, in which a reinforcing member is added to the groove of the rotor core in the embodiment indicated in FIG. 8.

When the groove 610a is formed on the other side of the rotor core 604, the mechanical strength is reduced also in some degree. Therefore, the core 604 can be broken at the formation of the groove or at the handling. Consequently it is suitable to stuff the groove 610a with a non-magnetic reinforcing member 610b for reinforcing the core 604, as seen in the embodiment indicated in FIG. 9.

For the non-magnetic reinforcing member 610b it is desirable to use a material such as a ceramic material having a thermal expansion coefficient, which is close to the thermal expansion coefficient of the rotor core 604 within a region of 15% for the same reason as described in the embodiment explained, referring to FIGS. 7A and 7B. That is, if the disc-shaped magnetic member is made of Ni—Zn or Mg—Zn ferrite, it is suitable to use a ceramic material made principally of silica or alumina for the non-magnetic reinforcing member. In this case, even if the non-magnetic reinforcing member is formed and sintered at the same time as the ferrite core (rotor core), no cracks or deformations are produced in the ferrite core or the non-magnetic material 610b by remaining internal stress due to the contraction at that time.

Figure 10:
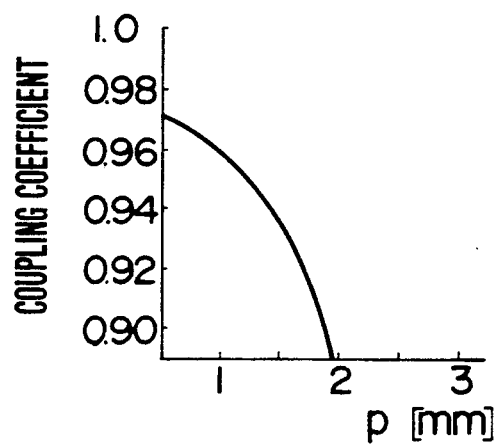
FIG. 10 shows a characteristic curve representing the relation between the value of the length P of the lead portion and the coupling coefficient K of the rotary transformer.

FIG. 10 indicates a characteristic curve representing the relationship between the length P of the lead portion (the depth of the throughholes 601a and 601b) and the coupling coefficient K in the rotary transformer.

The theoretical foundation for explaining why the value P should be restricted below 1 mm will be explained, referring to this figure.

In general, of course, it is desirable that the coupling coefficient of the rotary transformer required for a high performance rotary cylinder is as high as possible. However, in practice, it is thought that it should be greater than 0.95. In the meaning of dealing with the improvement of image quality of a VTR, which is a requirement of the future, the coupling coefficient should have a value greater than 0.96. From this point of view, taking the characteristics indicated in FIG. 10 into account, the value of P should be smaller than 1 mm.

Figure 12A:
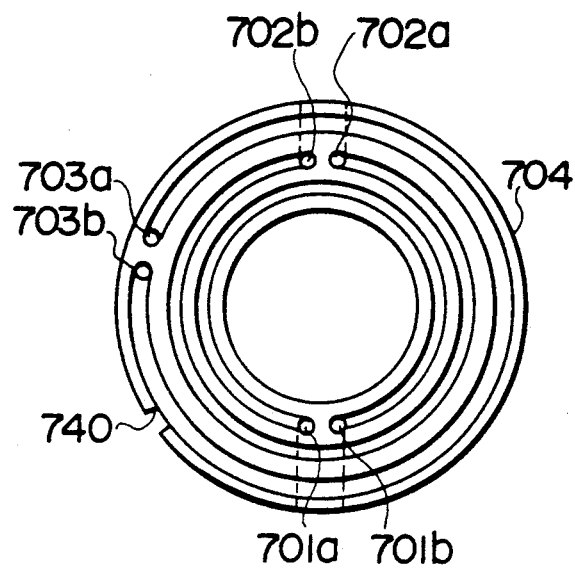
FIGS. 12A, 12B, 12C and 12D show a rotary transformer having a coil having a single turn in the embodiment indicated in FIG. 8, FIG. 12A being a plan view of the rotor core, FIG. 12B being a cross sectional view thereof, FIG. 12C being a plan view of the stator core, FIG. 12D being a cross sectional view thereof.
Figure 12B:
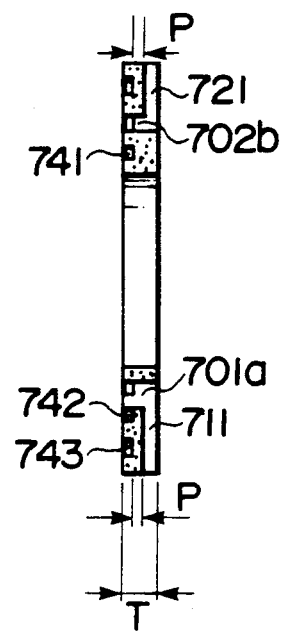

FIGS. 12A and 12B are schemes showing a rotor core for a coil having a single turn in the embodiment, as explained previously, referring to FIG. 8, as the whole; FIG. 12A being a plan view; FIG. 12B being a cross sectional view thereof.

In these figures there are two throughholes, e.g. 701a and 701b, for the starting lead and the ending lead, respectively, and it will be understood that the depth P of the throughholes is smaller than the thickness T of the core 704 and that it is intended to reduce the depth P to a value smaller than 1 mm.

Figure 12C:
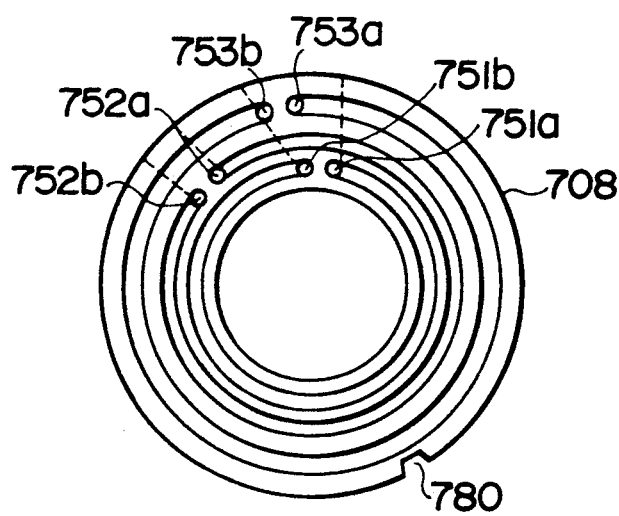
Figure 12D:
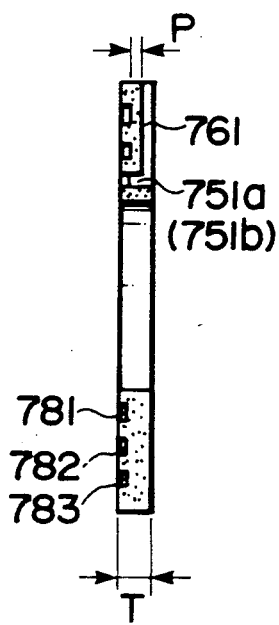

FIGS. 12C and 12D are schemes showing a stator core for the coil having a single turn corresponding to the rotor core in the embodiment explained, referring to FIGS. 12A and 12B, as the whole; FIG. 12C being a plan view; FIG. 12D being a cross sectional view thereof.

It will be understood that this case is also completely identical to the case of the rotor core.

Figure 13A:
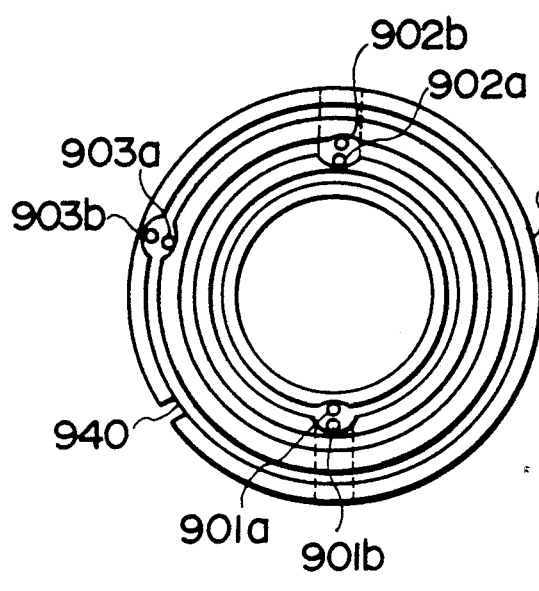
FIGS. 13A, 13B, 13C and 13D show another rotary transformer having a coil having a plurality of turns, FIG. 13A being a plan view of the rotor core, FIG. 13B being a cross sectional view thereof, FIG. 13C being a plan view of the stator core, FIG. 13D being a cross sectional view thereof.
Figure 13B:
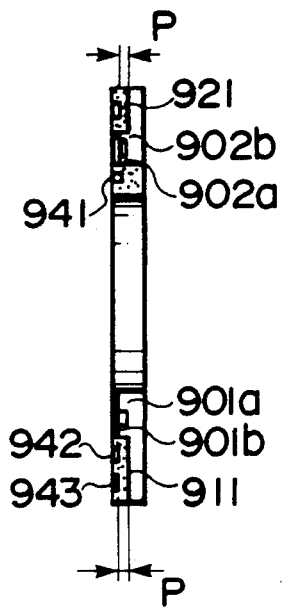

FIGS. 13A and 13B are schemes showing a rotor core for the coil having a plurality of turns in the embodiment, as explained, referring to FIG. 8, as the whole; FIG. 13A being a plan view; FIG. 13B being a cross sectional view.

In these figures there are two throughholes, e.g. 901a and 901b, for the starting lead and the ending lead, respectively, and it will be understood that the depth P of the throughholes is smaller than the thickness T of the core 904 and that it is intended to reduce the depth P to a value smaller than 1 mm.

Figure 13C:
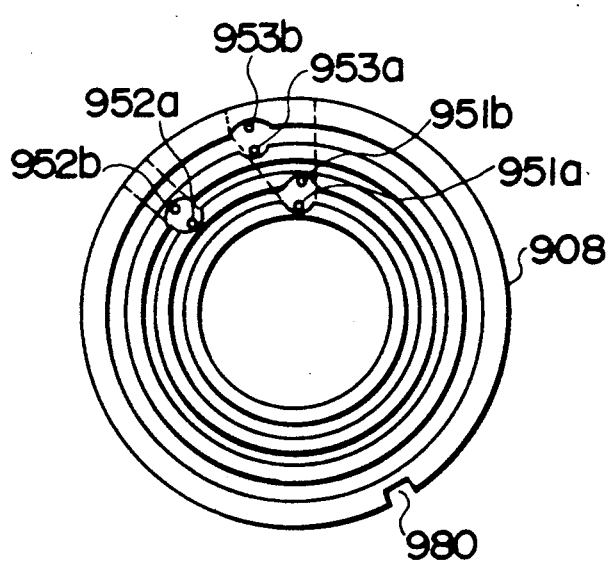
Figure 13D:
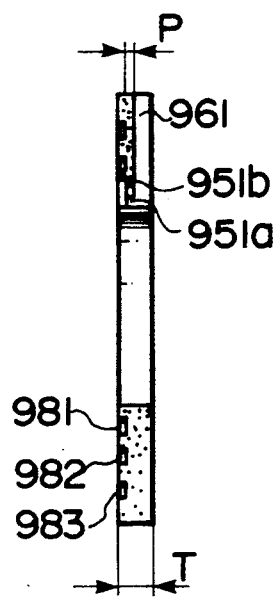
Figure 14:
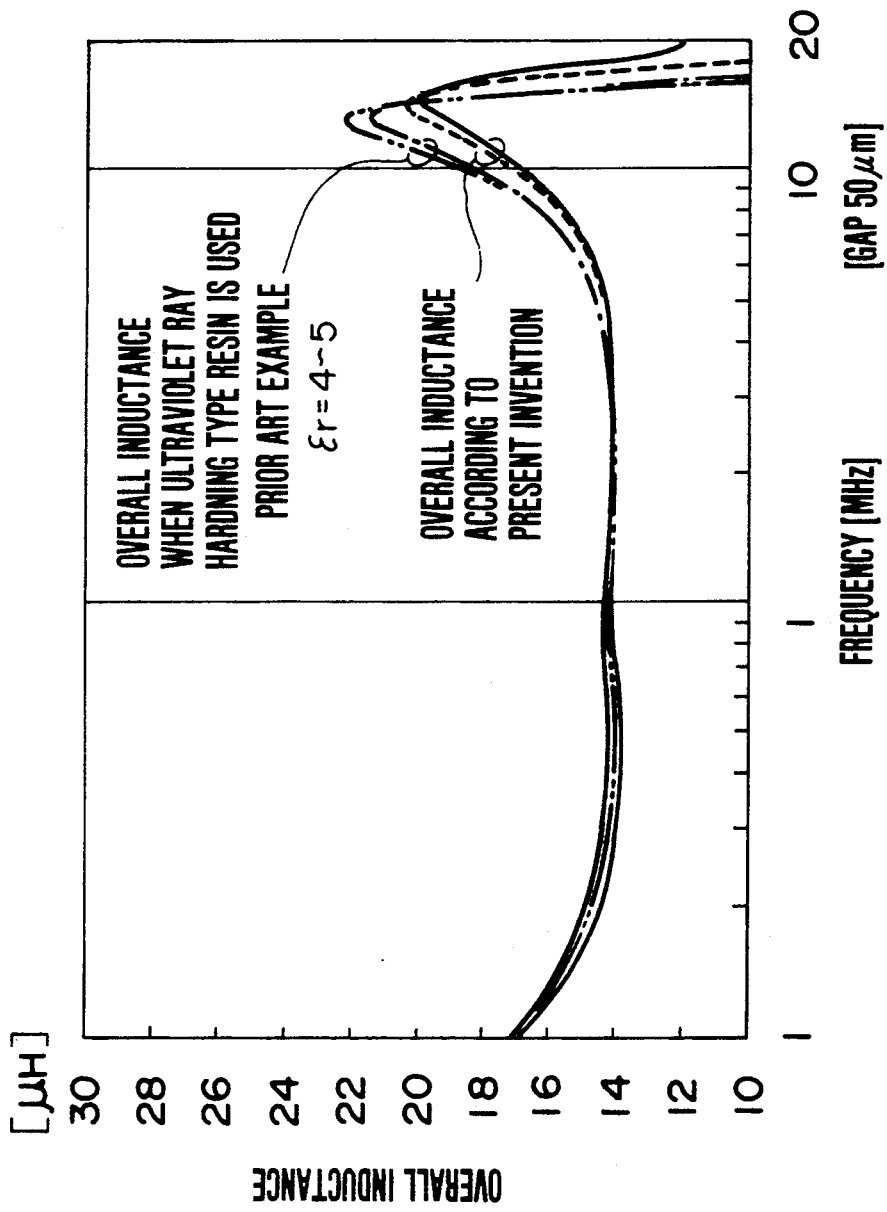
FIG. 14 shows characteristic curves comparing those obtained according to an embodiment of the present invention with those obtained by a prior art example, in which the ordinate represents the overall inductance and the abscissa the frequency.
Figure 15:
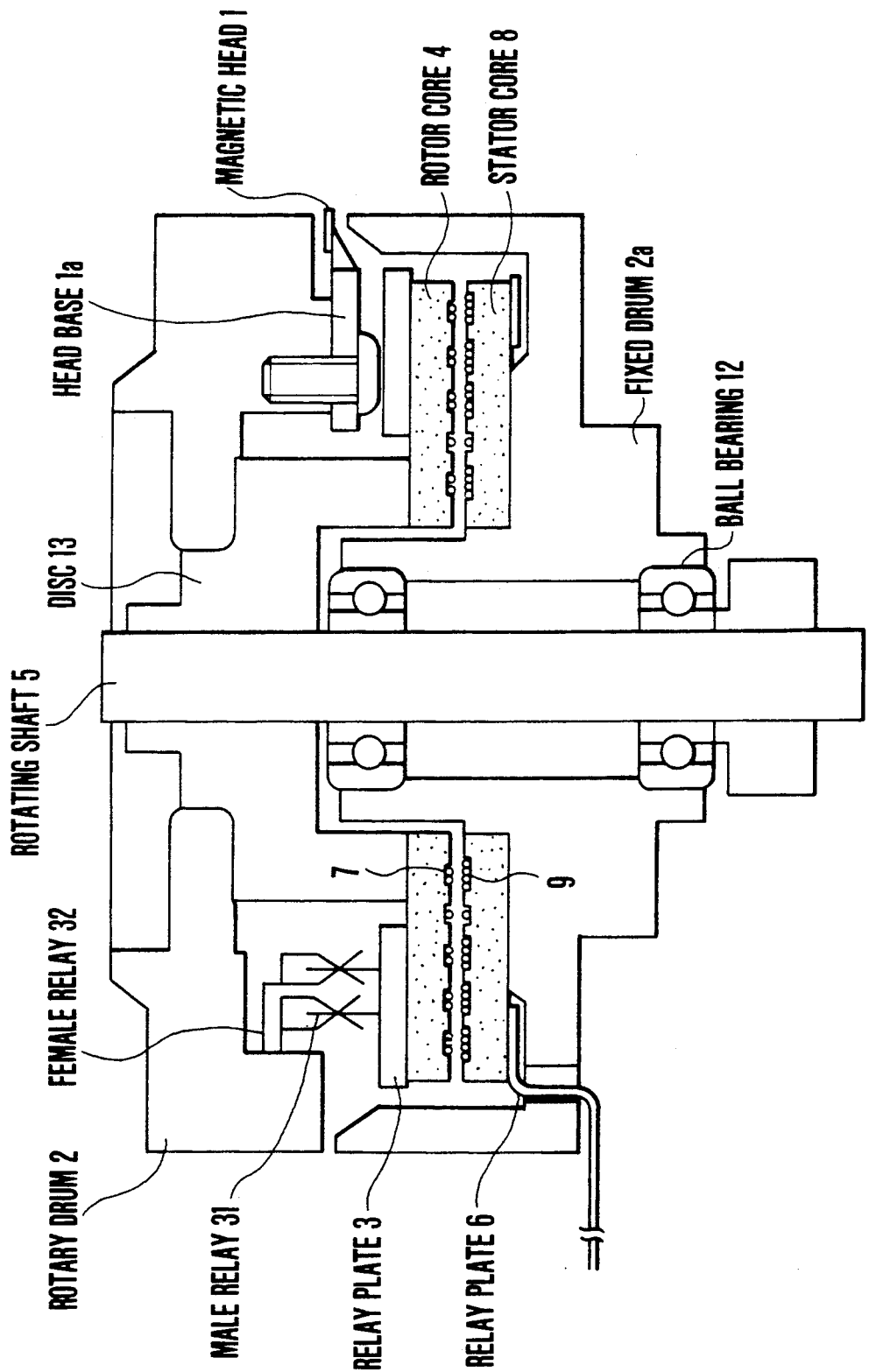
FIG. 15 is a cross sectional view of a rotating cylinder of a rotary magnetic head.
Figure 16A:
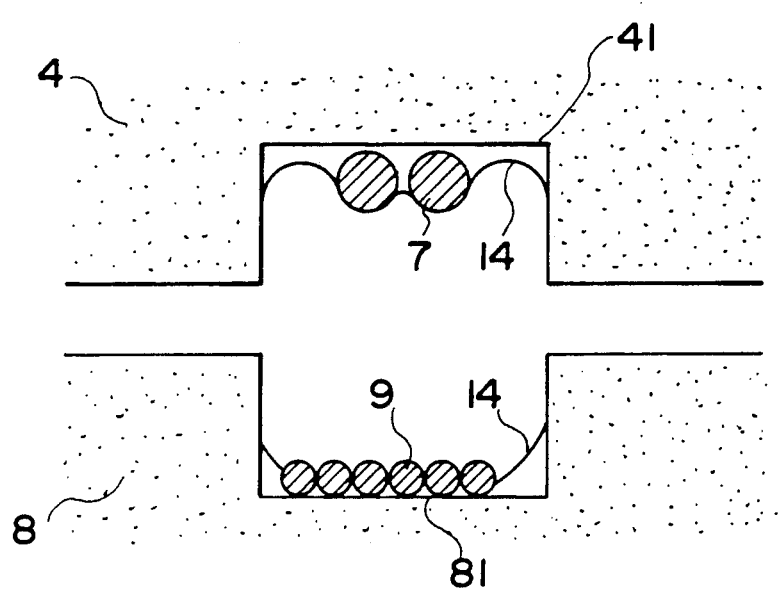
FIGS. 16A, 16B, 16C and 16D are cross sectional views of the principal part of the rotor core and the stator core in different rotary transformers, in FIGS. 16A and 16B insulated coated conductors being mounted, in FIGS. 16C and 16D conductors being formed directly by sputtering, evaporation and the photolithographic technique.
Figure 16B:
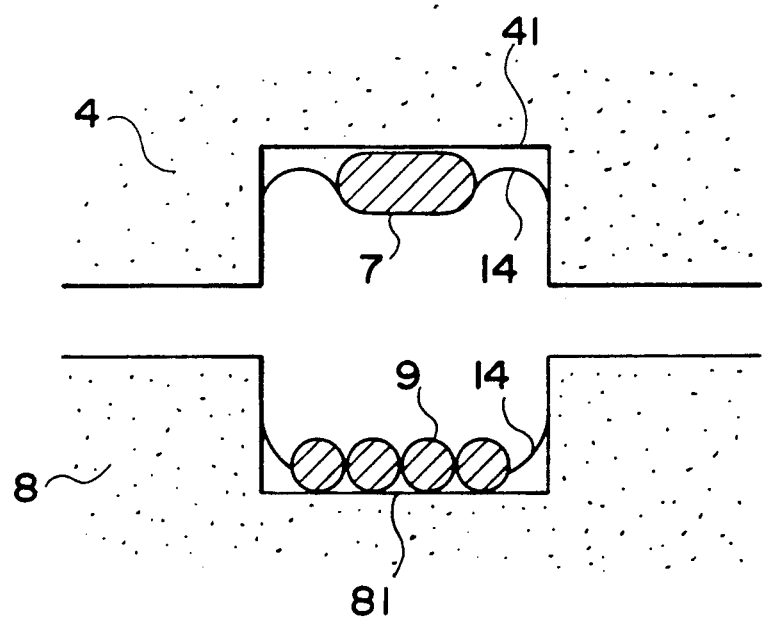
Figure 16C:
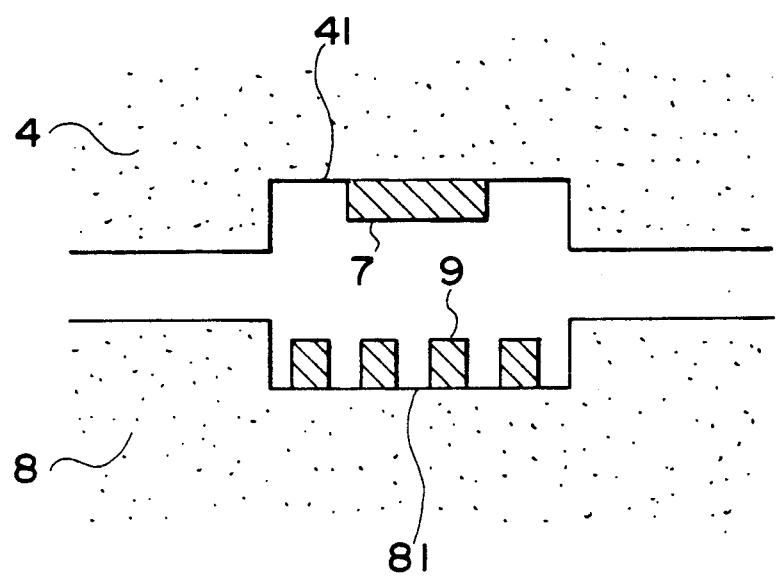
Figure 16D:
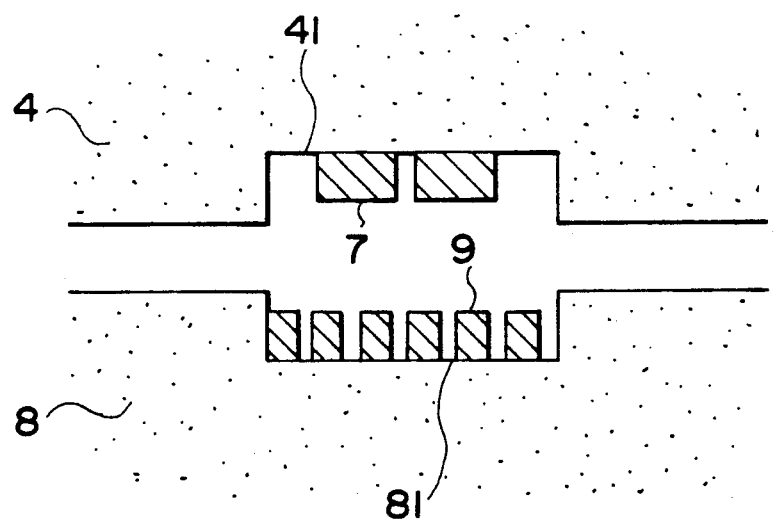
Figure 17A:
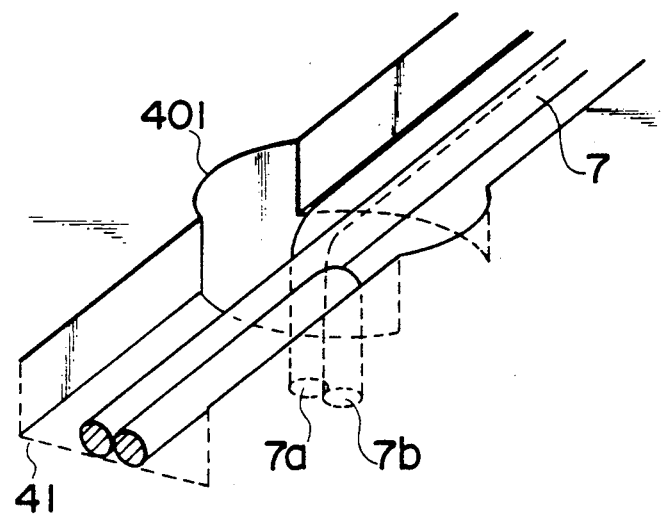
FIGS. 17A, 17B, 17C, 17D and 17E are perspective views showing how to draw out the starting and the ending extremity of the lead, FIG. 17A indicating how to draw out a coil having a plurality of turns, FIGS. 17B and 17C indicating how to draw out a coil having the unit number of turn, FIG. 17D indicating how to draw out the coil having a plurality of turns through a groove, FIG. 17E indicating how to draw out the coil by sputtering, etc.
Figure 17B:
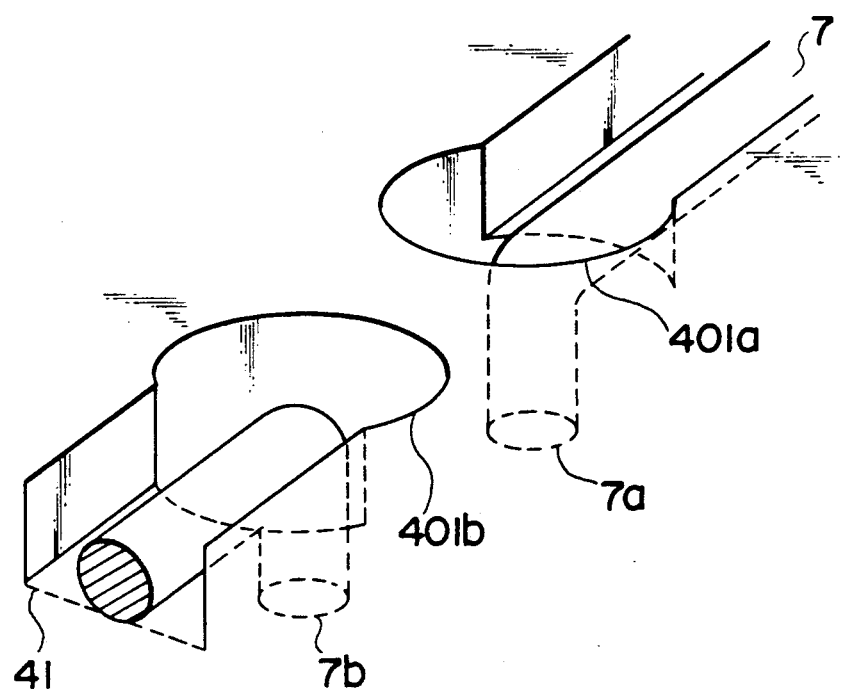
Figure 17C:
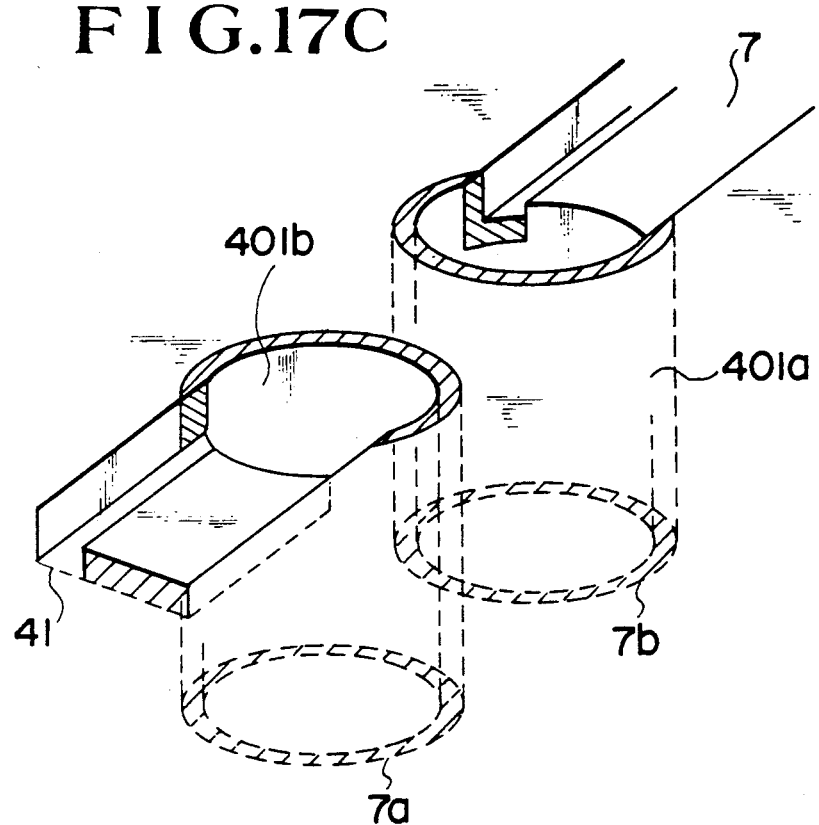
Figure 17D:
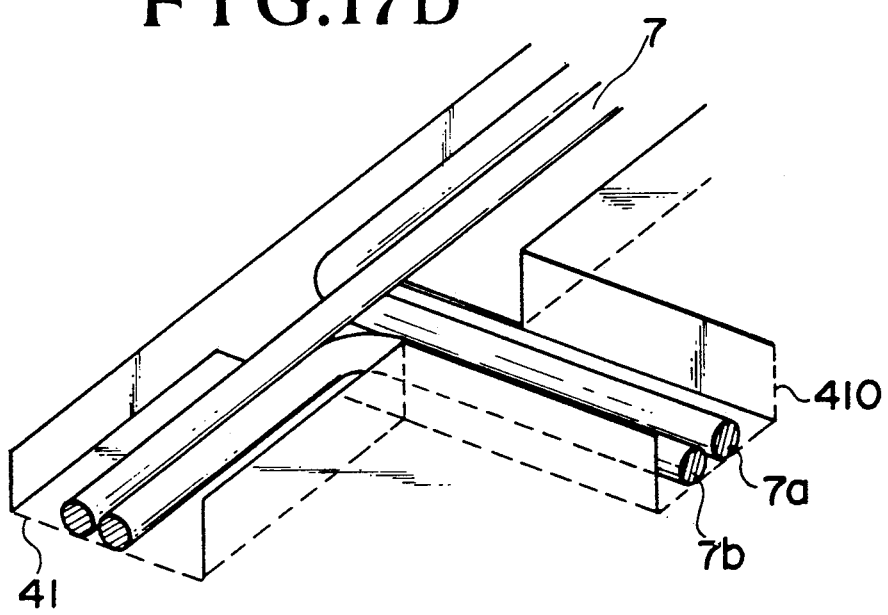
Figure 17E:
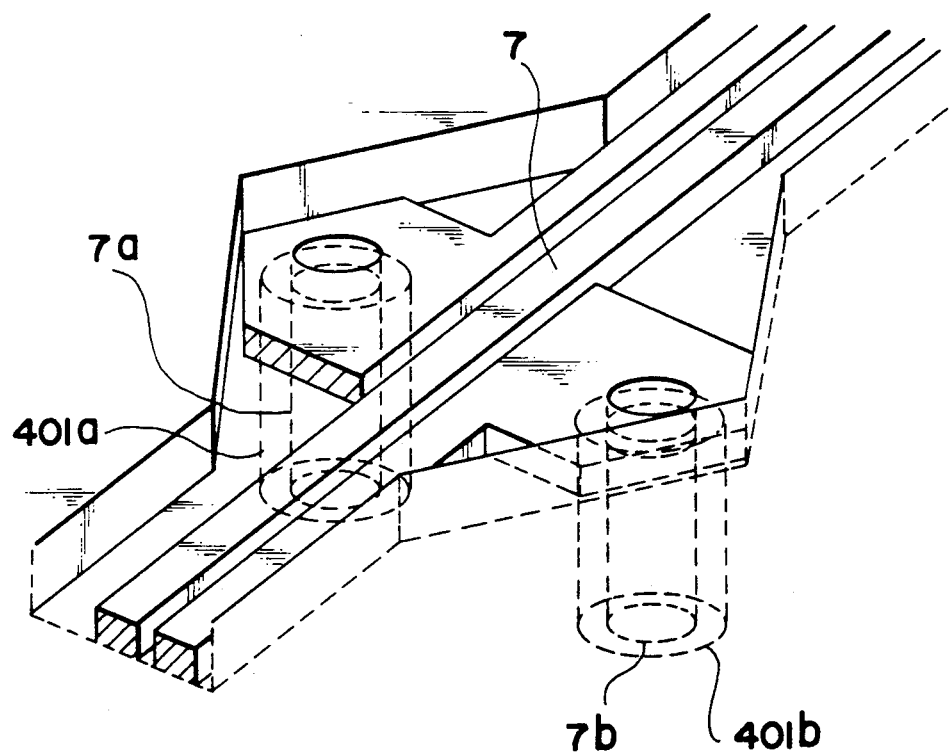
Figure 18A:
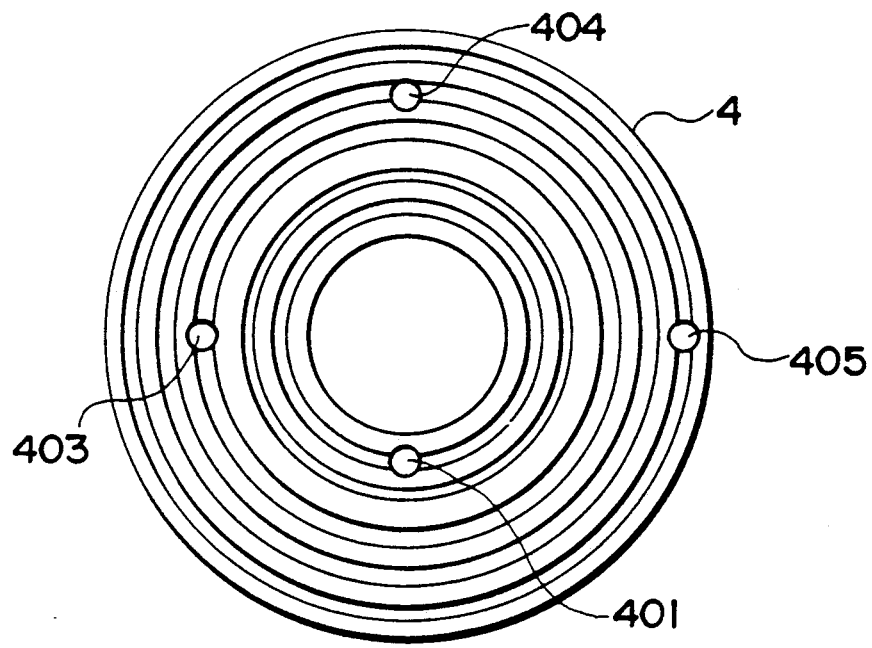
FIGS. 18A, 18B, 18C, 18D, 18E and 18F show a rotary transformer, in which the coil is arranged as indicated in FIG. 17A, FIG. 18A being a plan view of the rotor core, FIG. 18B being a cross sectional view thereof, FIG. 18C being a back view thereof, FIG. 18D being a plan view of the stator core, FIG. 18E being a cross sectional view thereof, FIG. 18F being a back view thereof.
Figure 18B:
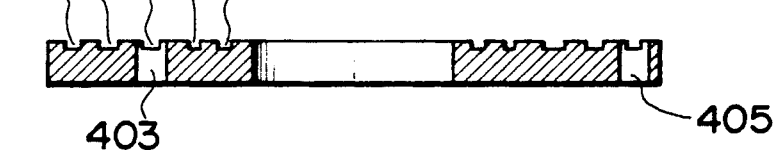
Figure 18C:
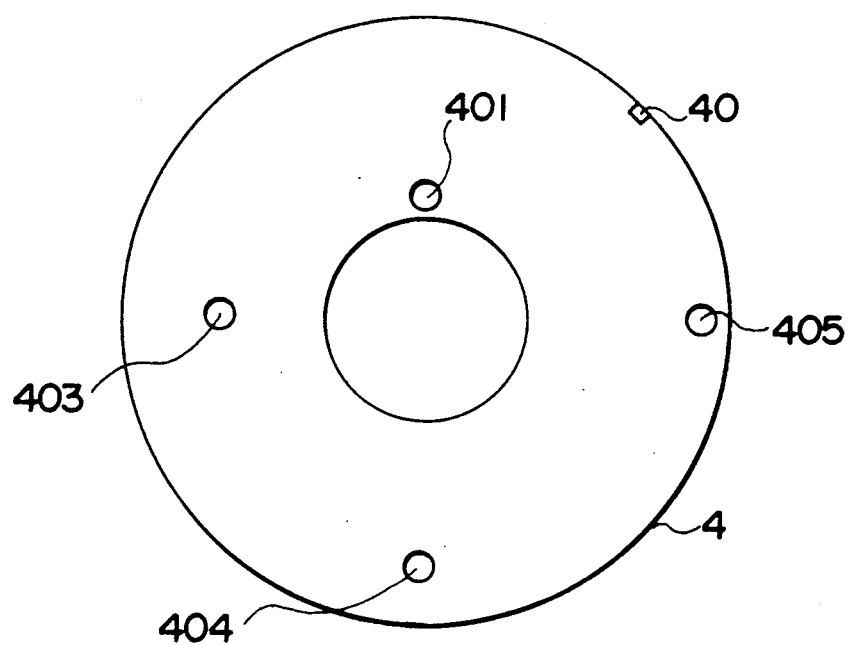
Figure 18D:
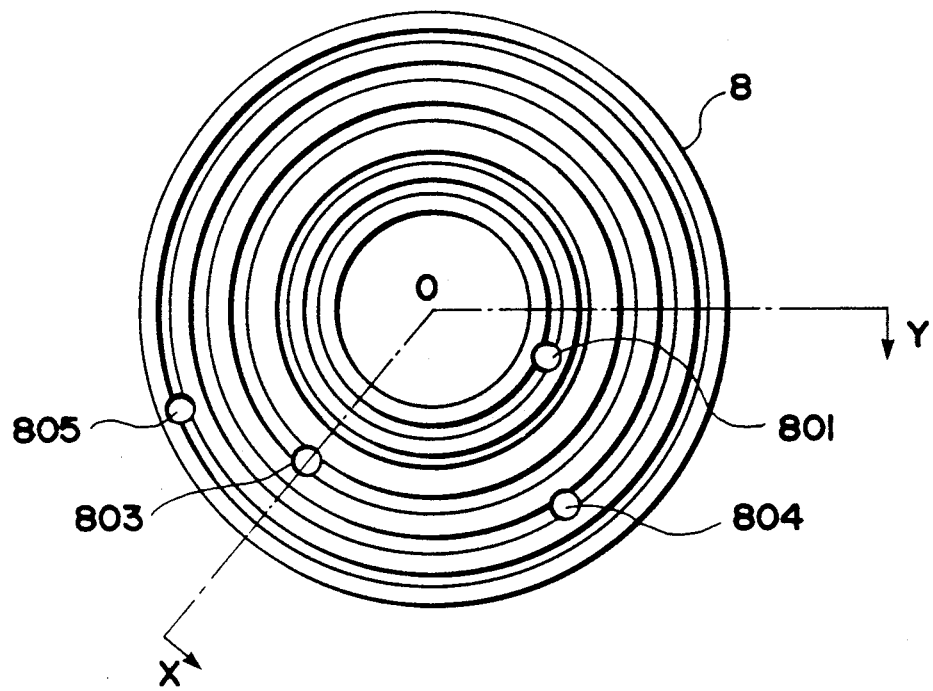
Figure 18E:
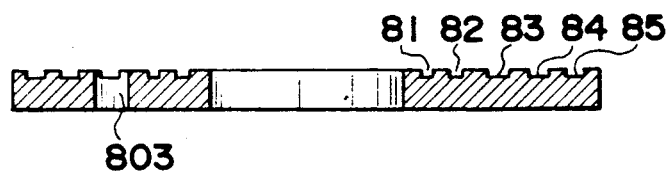
Figure 18F:
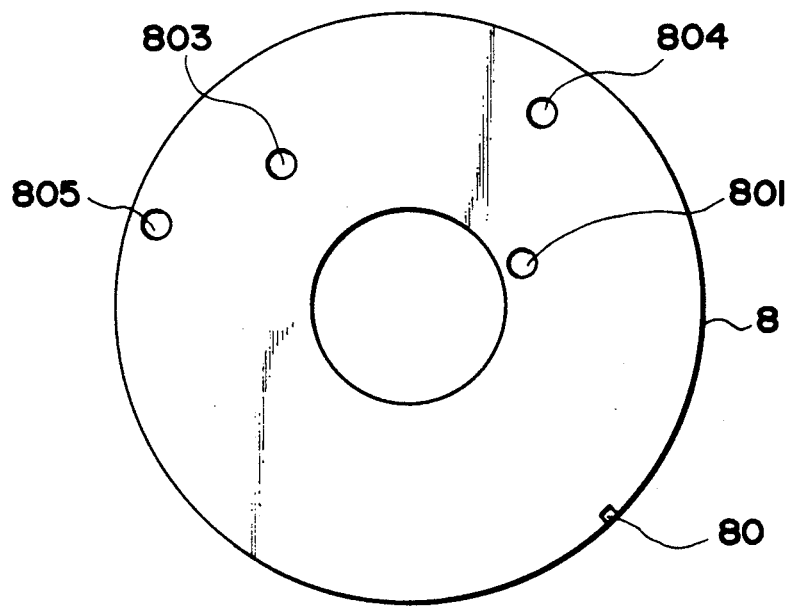
Figure 19A:
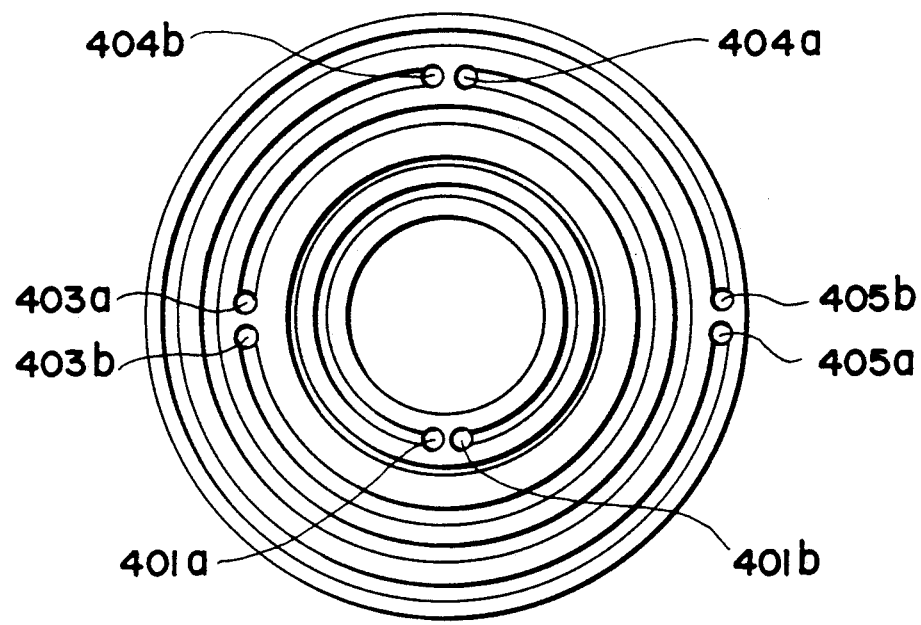
FIGS. 19A, 19B, 19C, 19D, 19E and 19F show another transformer, in which the coil is arranged as indicated in FIG. 17B, FIG. 19A being a plan view of the rotor core, FIG. 19B being a cross sectional view thereof, FIG. 19C being a back view thereof, FIG. 19D being a plan view of the stator core, FIG. 19E being a cross sectional view thereof, FIG. 19F being a block view thereof.
Figure 19B:
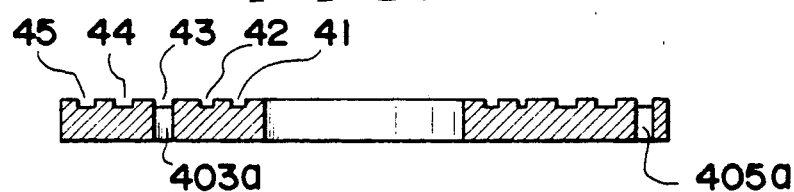
Figure 19C:
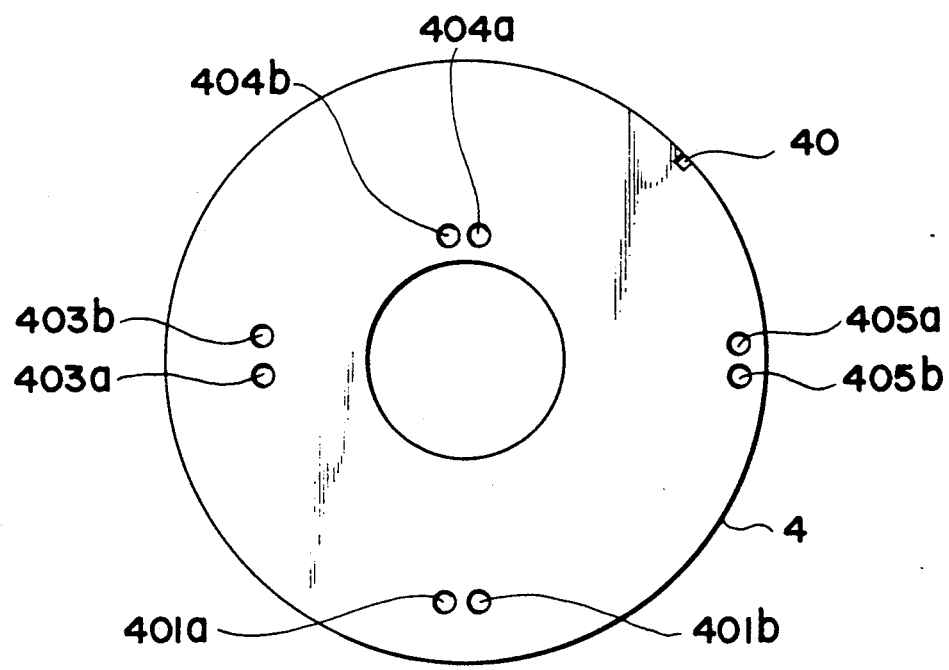
Figure 19D:
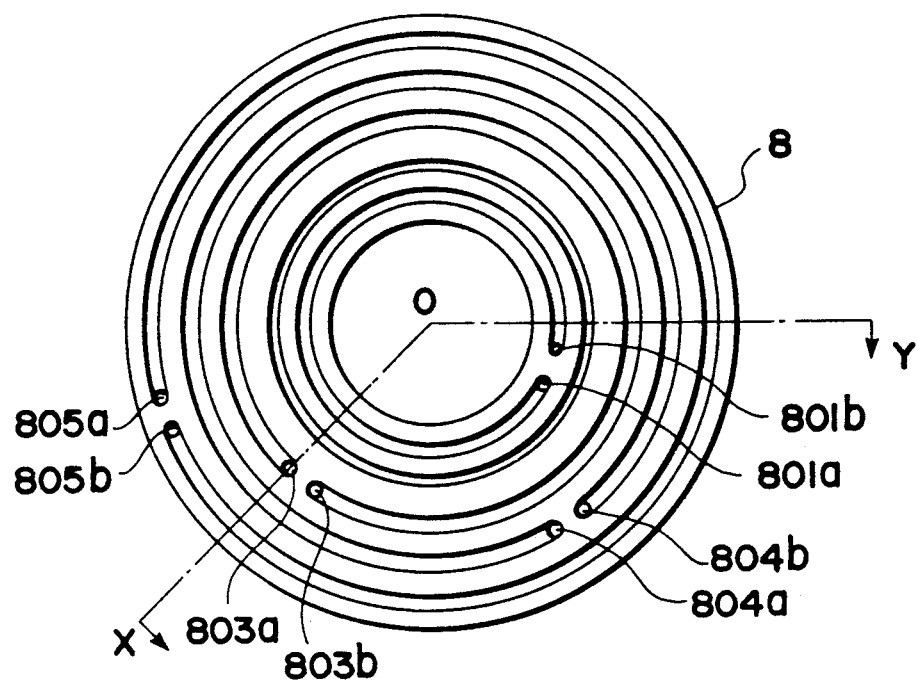
Figure 19E:
Figure 19F:
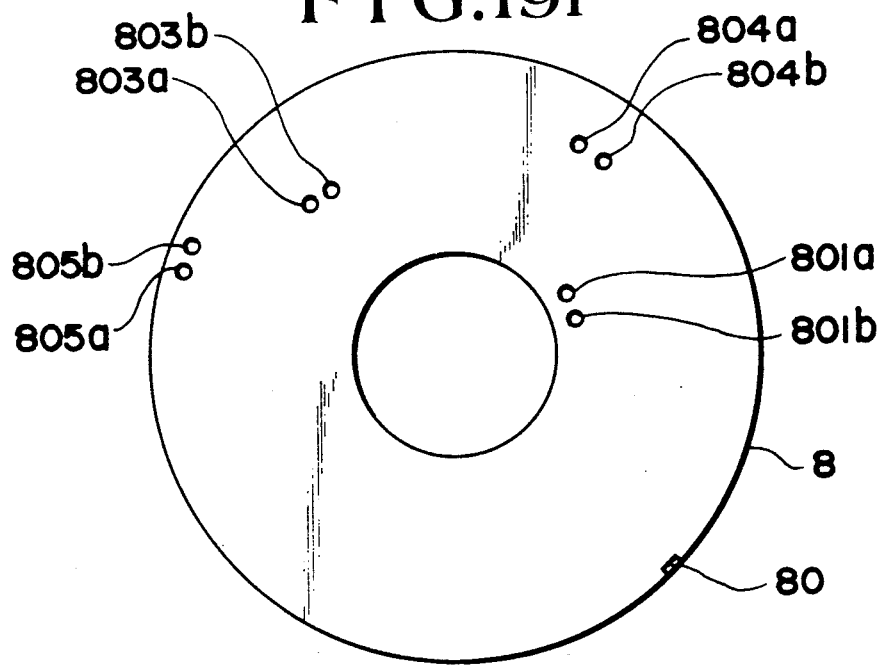
Figure 20A:
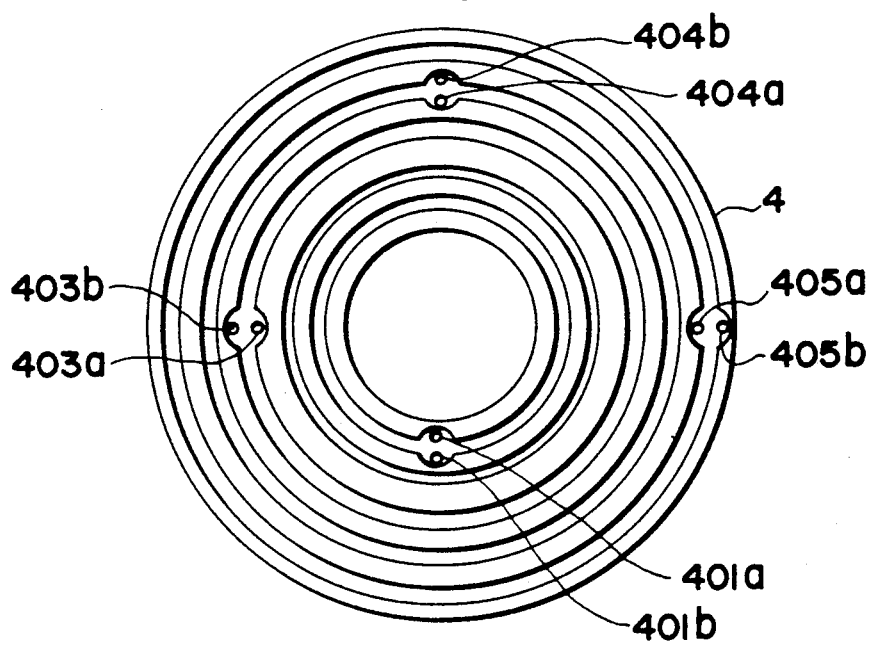
FIGS. 20A, 20B, 20C, 20D, 20E and 20F show still another transformer, in which the coil is arranged almost similarly to that indicated in FIG. 17E, FIG. 20A being a plan view of the rotor core, FIG. 20B being a cross sectional view thereof, FIG. 20C being a back view thereof, FIG. 20D being a plan view of the stator core, FIG. 20E being a cross sectional view thereof, FIG. 20F being a back view, thereof.
Figure 20B:
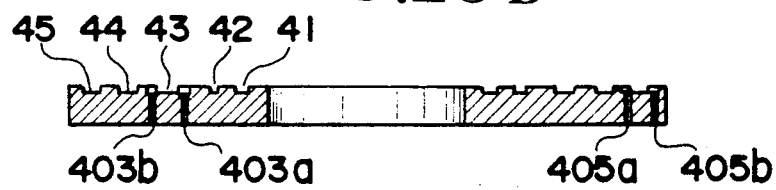
Figure 20C:
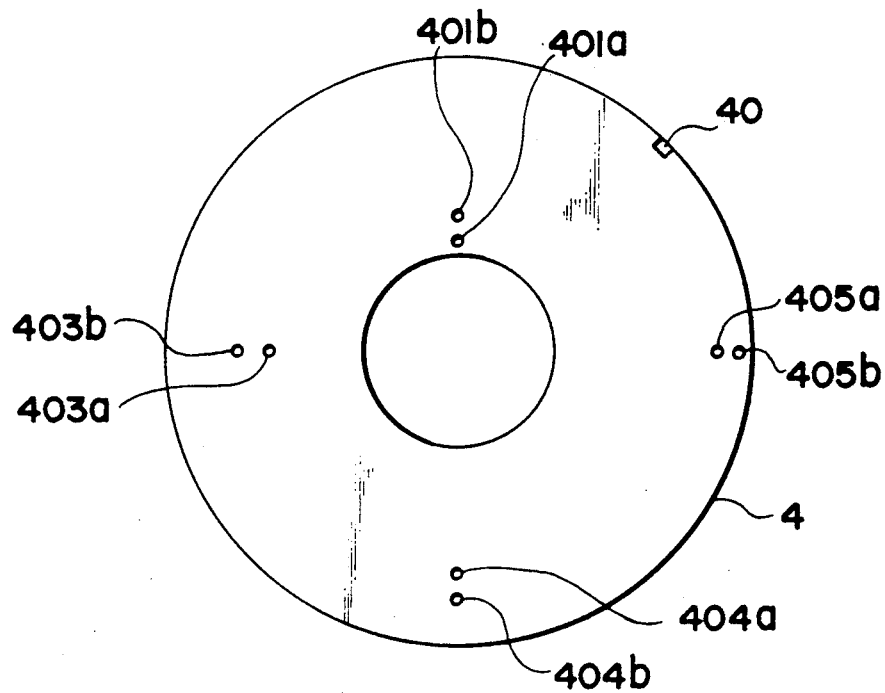
Figure 20D:
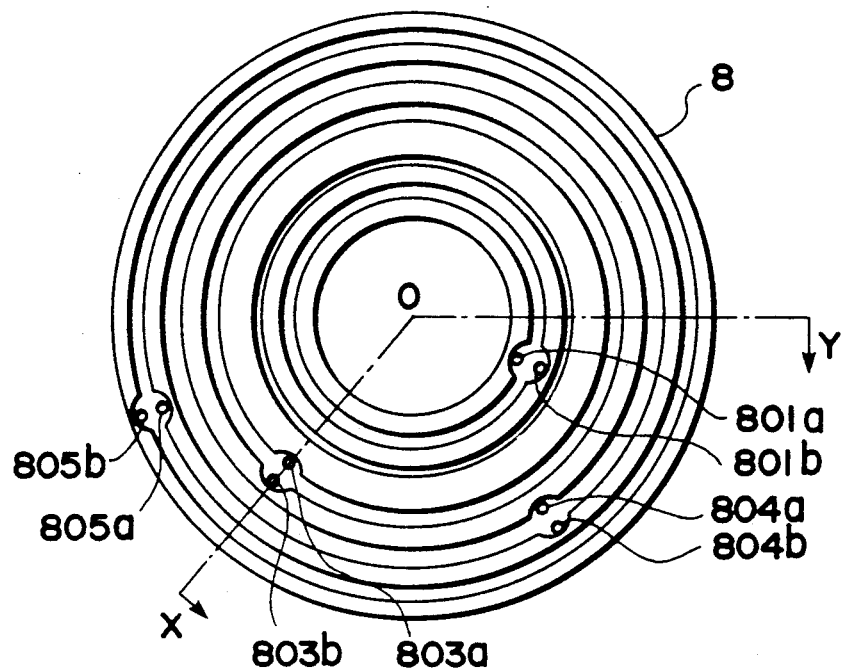
Figure 20E:
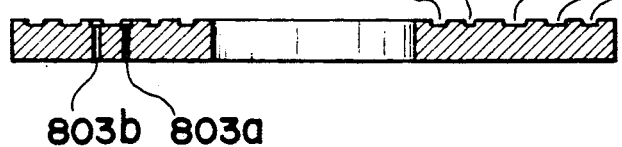
Figure 20F:
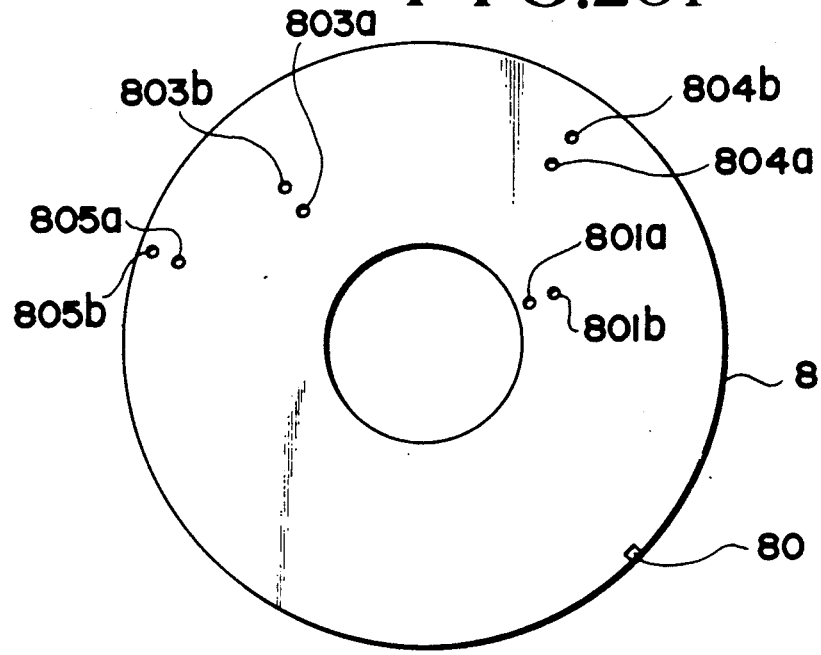
Figure 21A:
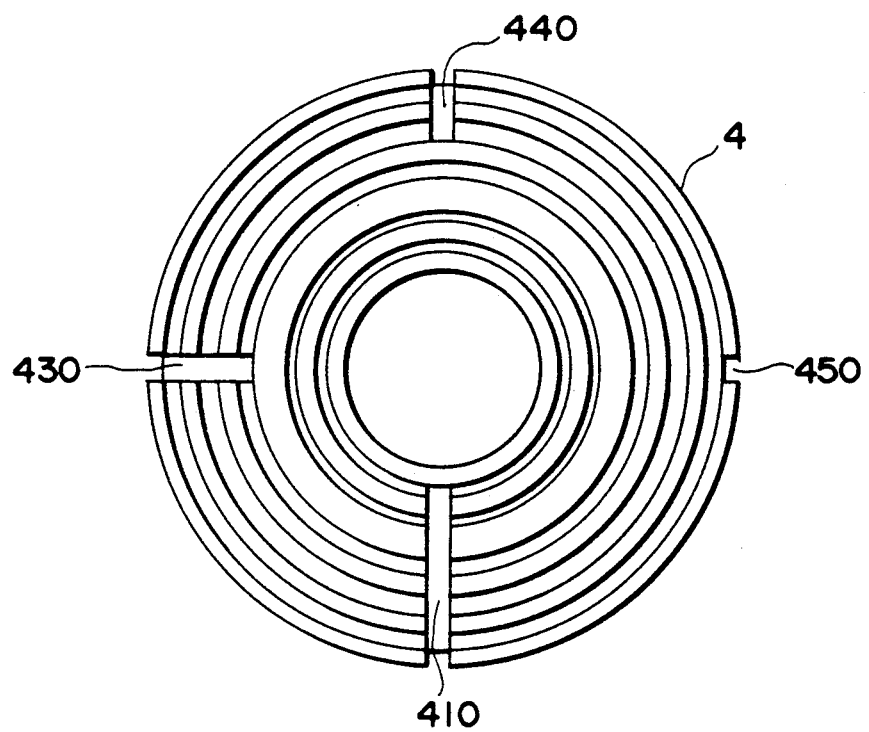
FIGS. 21A, 21B, 21C, 21D, 21E and 21F show still another rotary transformer, in which the coil is arranged as indicated in FIG. 17D, FIG. 21A being a plan view of the rotor core, FIG. 21B being a cross sectional view thereof, FIG. 21C being a back view thereof, FIG. 21D being a plan view of the stator core, FIG. 21E being a cross sectional view thereof, FIG. 21F being a back view thereof.
Figure 21B:
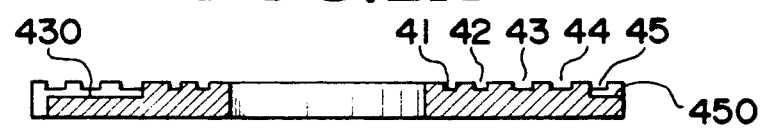
Figure 21C:
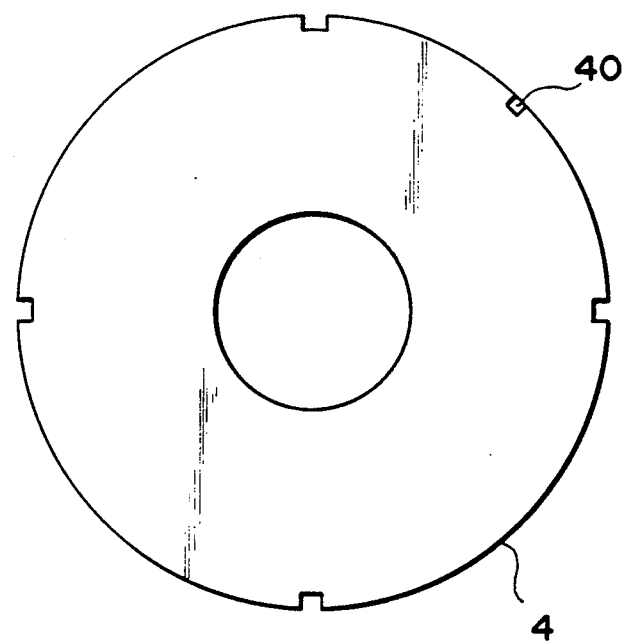
Figure 21D:
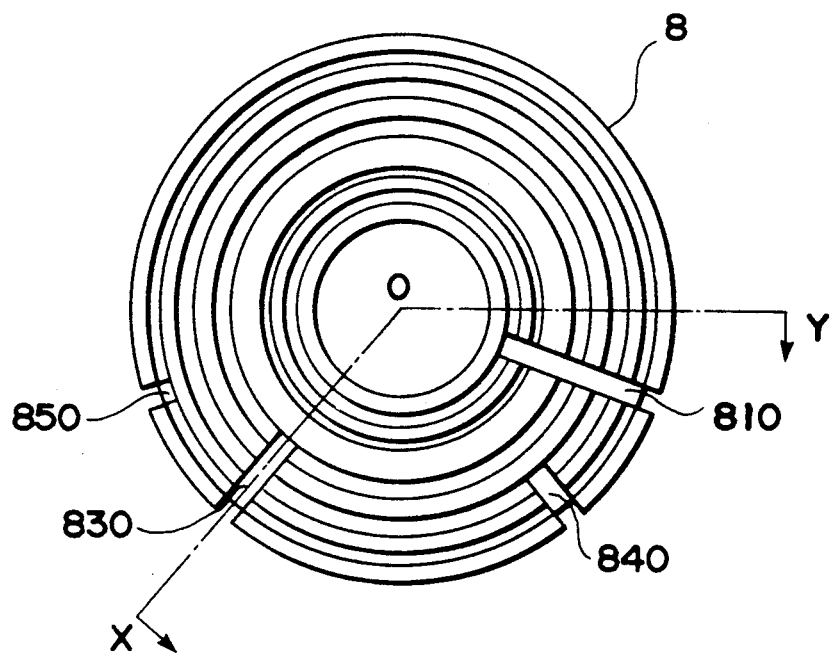
Figure 21E:
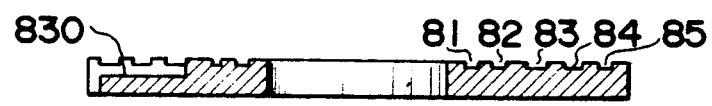
Figure 21F:
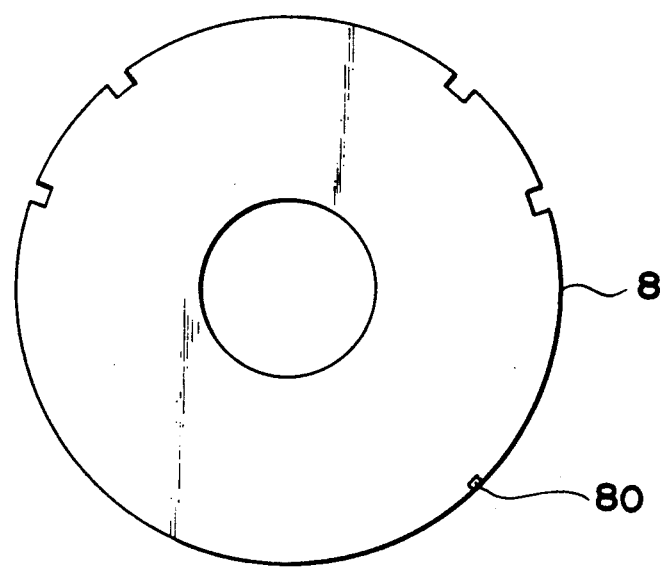
Figure 22A:
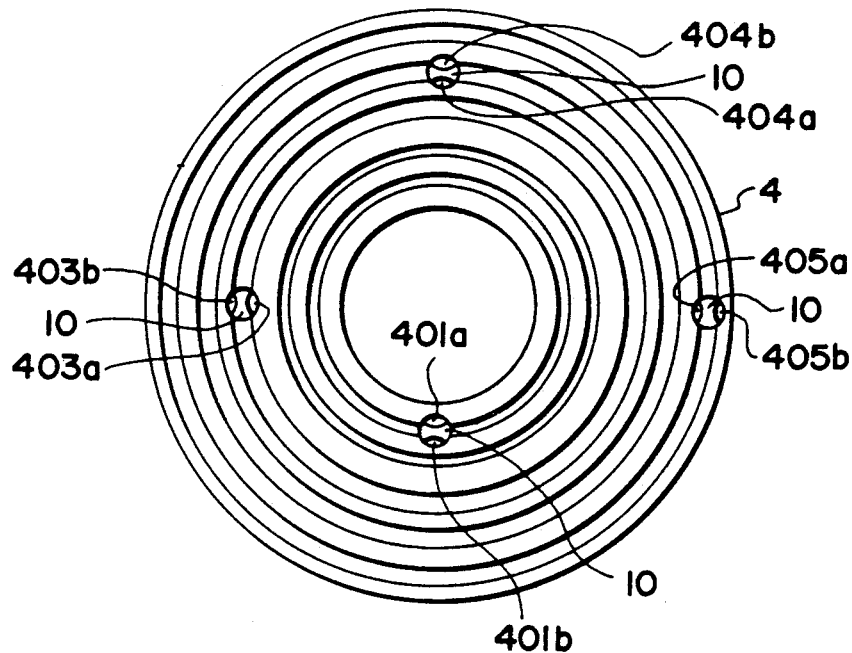
FIG. 22A, 22B, 22C; 22D, 22E and 22F show a related art example, in which the throughhole in the rotary transformer is divided into small holes by means of a partitioning member made of resin, FIG. 22A being a plan view of the rotor core, FIG. 22B being a cross sectional view thereof, FIG. 22C being a back view thereof, FIG. 22D being a plan view of the stator core, FIG. 22E being a cross sectional view thereof, FIG. 22F being a back view thereof.
Figure 22B:
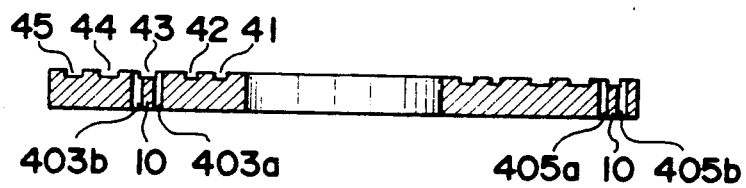
Figure 22C:
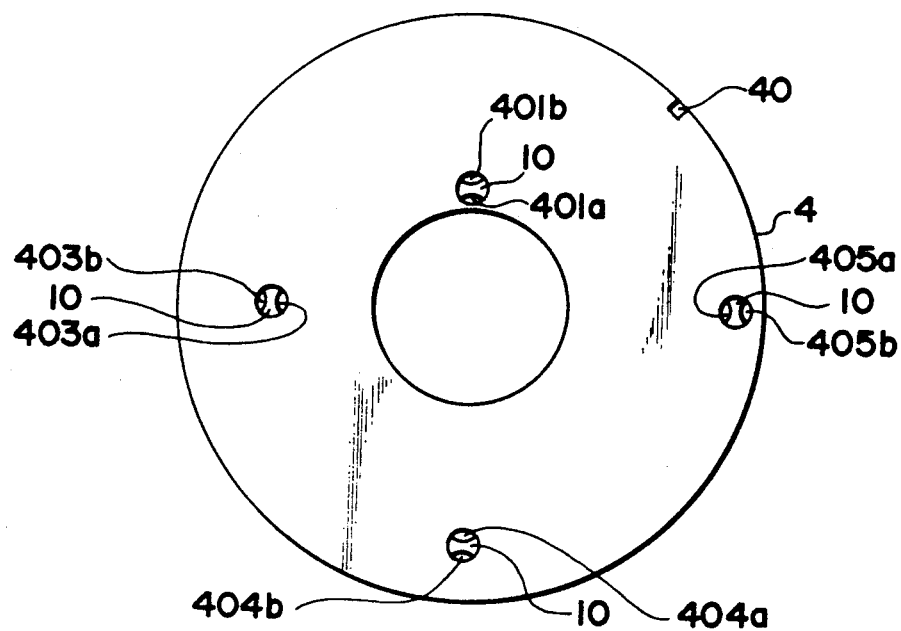
Figure 22D:
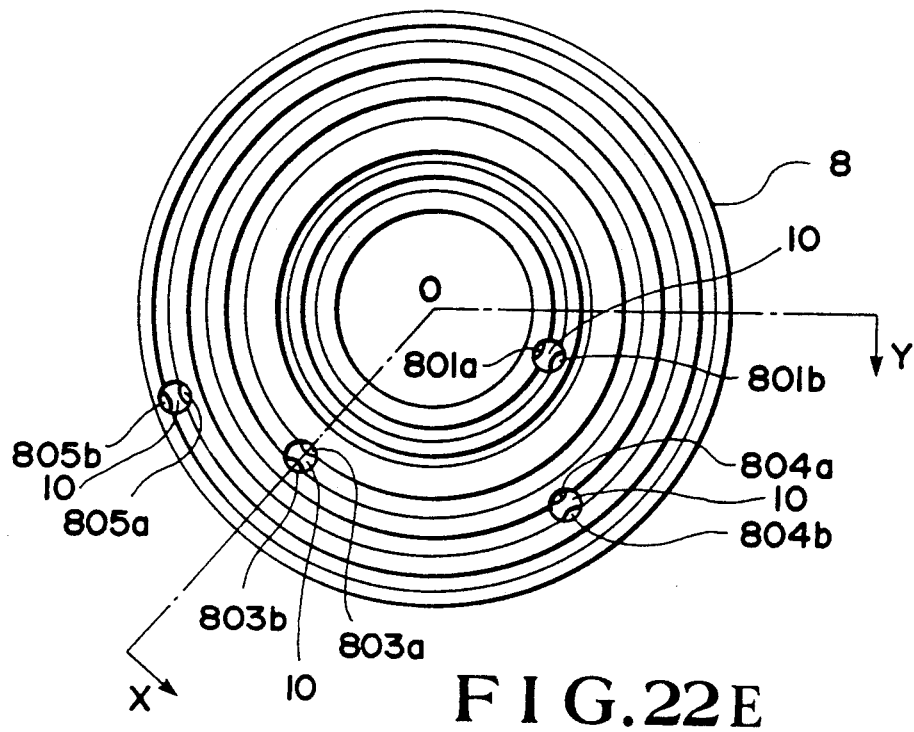
Figure 22E:
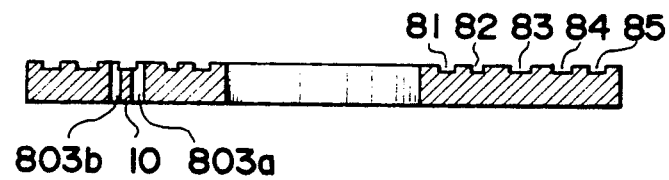
Figure 22F:
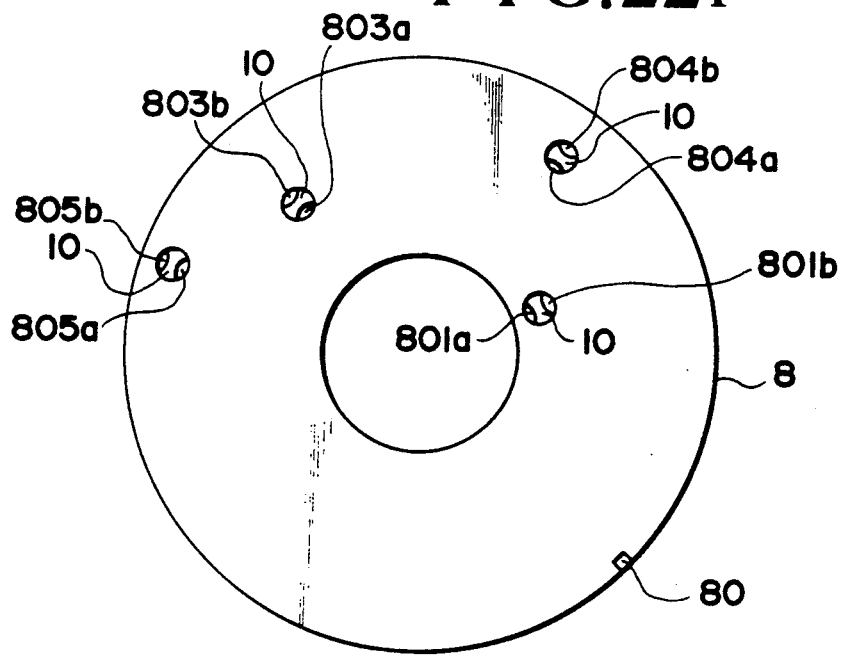

FIGS. 13C and 13D are schemes showing a stator core for the coil having a plurality of turns corresponding to the rotor core in the embodiment explained, referring to FIG. 13A and 13B, as the whole; FIG. 13C being a plan view; FIG. 13D is a cross sectional view thereof.

It will be understood that this case is also completely identical to the case of the rotor core.

While particular embodiments of the present invention have been shown and described, it will be obvious to those skilled in the art that various changes and modifications may be made without departing from the present invention in its broader aspect.

We claim:

1. A rotary magnetic head device comprising:
a rotary drum;
a fixed drum;
a plurality of magnetic heads mounted on the rotary drum;
a rotor core mounted on the rotary drum, the rotor core having a first surface and a second surface on opposite sides of the rotor core and including a plurality of coil conductors disposed in respective grooves formed in the first surface of the rotor core; and a stator core mounted on the fixed drum, the stator core having a first surface and a second surface on opposite sides of the stator core and including a plurality of coil conductors disposed in respective grooves formed in the first surface of the stator core;

wherein the rotor core and the stator core are disposed such that the first surface of the rotor core faces the first surface of the stator core, thereby forming a rotary transformer for transmitting signals to be recorded from the fixed drum to the magnetic heads through the coil conductors, and for transmitting reproduced signals from the magnetic heads to the fixed drum through the coil conductors; and wherein at least one of the rotor core and the stator core has at least one pair of throughholes formed therein, the throughholes being linked to each other by a linking slit having a width smaller than outer dimensions of the throughholes, a first end and a second end of a respective one of the coil conductors being led to the second surface of the at least one of the rotor core and the stator core through respective ones of the throughholes.

2. A rotary magnetic head device according to claim 1, further comprising lead conductors disposed in respective grooves formed in the second surface of the rotor core and in the second surface of the stator core, the lead conductors being electrically connected to respective first and second ends of respective ones of the coil conductors, the coil and lead conductors being formed using at least a photolithographic technique;

wherein depths of the grooves formed in the first and second surfaces of the rotor and stator cores are between 0.05 and 0.15 mm such that the coil and lead conductors do not protrude from the first and second surrfaces of the rotor and stator cores.

3. A rotary magnetic head device according to claim 1, wherein the coil conductors are formed using at least a photolithographic technique, and wherein the throughholes have a cross section with at least one side which is a straight line.

4. A rotary magnetic head device according to claim 1, wherein the coil conductors are formed using at least a photolithographic technique, and wherein the throughholes are formed in portions of the at least one of the rotor core and the stator core in which the respective grooves are not formed.

5. A rotary magnetic head device comprising:
a rotary drum;
a fixed drum;
a plurality of magnetic heads mounted on the rotary drum;
a rotor core mounted on the rotary drum, the rotor core having a first surface and a second surface on opposite sides of the rotor core and including a plurality of coil conductors disposed in respective grooves formed in the first surface of the rotor core, and a plurality of lead conductors disposed in respective grooves formed in the second surface of the rotor core, the lead conductors being electrically connected to respective first and second ends of respective ones of the coil conductors through respective throughholes formed in the rotor core; and a stator core mounted on the fixed drum, the stator core having a first surface and a second surface on opposite sides of the stator core and including a plurality of coil conductors disposed in respective grooves formed in the first surface of the stator core, and a plurality of lead conductors disposed in respective grooves formed in the second surface of the stator core, the lead conductors being electrically connected to respective first and second ends of respective ones of the coil conductors through respective throughholes formed in the stator core;

wherein the rotor core and the stator core are disposed such that the first surface of the rotor core faces the first surface of the stator core, thereby forming a rotary transformer for transmitting signals to be recorded from the fixed drum to the magnetic heads through the coil and lead conductors, and for transmitting reproduced signals from the magnetic heads to the fixed drum through the coil and lead conductors; and wherein depths of the grooves formed in the first and second surfaces of the rotor and stator cores are between 0.05 mm and 0.15 mm.

6. A rotary magnetic head device according to claim 5, wherein the coil and lead conductors are formed using at least a photolithographic technique, and wherein the coil and lead conductors do not protrude from the first and second surfaces of the rotor and stator cores.

7. A rotary magnetic head device comprising:
a rotary drum;
a fixed drum;
a plurality of magnetic heads mounted on the rotary drum;
a rotor core formed of a magnetic material and mounted on the rotary drum, the rotor core having a first surface and a second surface on opposite sides of the rotor core and including a plurality of coil conductors disposed in respective grooves formed in the first surface of the rotor core; and a stator core formed of a magnetic material and mounted on the fixed drum, the stator core having a first surface and a second surface on opposite sides of the stator core and including a plurality of coil conductors disposed in respective grooves formed in the first surface of the stator core;

wherein the rotor core and the stator core are disposed such that the first surface of the rotor core faces the first surface of the stator core, thereby forming a rotary transformer for transmitting signals to be recorded from the fixed drum to the magnetic heads through the coil conductors, and for transmitting reproduced signals from the magnetic heads to the fixed drum through the coil conductors; and wherein at least one of the rotor core and the stator core has at least one pair of throughholes formed therein through which a first end and a second end of a respective one of the coil conductors are respectively led to the second surface of the at least one of the rotor core and the stator core, each pair of the at least one pair of throughholes being formed by disposing a respective non-magnetic partitioning member in a respective single hole formed in the at least one of the rotor core and the stator core, thereby dividing the single hole into the at least one pair of throughholes, the non-magnetic partitioning member having a thermal expansion coefficient which is within 15% of a thermal expansion coefficient of the magnetic material of which the at least one of the rotor core and the stator core is formed.

8. A rotary magnetic head device according to claim 7, wherein the at least one of the rotor core and the stator core and the non-magnetic partitioning member are simultaneously formed as an integral unit by injection molding.

9. A rotary magnetic head device comprising:
a rotary drum;
a fixed drum;
a plurality of magnetic heads mounted on the rotary drum;
a rotor core mounted on the rotary drum, the rotor core having a first surface on opposite sides of the rotor core and including a plurality of coil conductors disposed in respective grooves formed in the first surface of the rotor core; and
a stator core mounted on the fixed drum, the stator core having a first surface and a second surface of opposite sides of the stator core and including a plurality of coil conductors disposed in respective grooves formed in the first surface of the stator core;
wherein the rotor core and the stator core are disposed such that the first surface of the rotor core faces the first surface of the stator core, thereby forming a rotary transformer for transmitting signals to be recorded from the fixed drum to the magnetic heads through the coil conductors, and for transmitting reproduced signals from the magnetic heads to the fixed drum through the coil conductors;
wherein at least one of the rotor core and the stator core has at least one pair of throughholes formed therein, the throughholes being separated from each other, a first end and a second end of a respective one of the coil conductors being led to the second surface of the at least one of the rotor core and the stator core through respective ones of the throughholes; and
wherein a recess is formed in the second surface of the at least one of the rotor core and the stator core at a portion of the at least one of the rotor core and the stator core in which the throughholes are formed, the recess having a depth such that lengths of the throughholes are less than 1 mm.

10. A rotary magnetic head device according to claim 9, wherein the at least one of the rotor core and the stator core is formed of a magnetic material, and further comprising a non-magnetic reinforcing member disposed in the recess and having a thermal expansion coefficient which is within 15% of a thermal expansion coefficient of the magnetic material of which the at least one of the rotor core and stator core is formed.

11. A rotary magnetic head device according to claim 10, wherein the at least one of the rotor core and the stator core and the non-magnetic reinforcing member are simultaneously formed in an integral unit by injection molding.

* * * * *